US012080840B2

(12) United States Patent
Hamaoka et al.

(10) Patent No.: US 12,080,840 B2
(45) Date of Patent: Sep. 3, 2024

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Satoshi Hamaoka, Kariya (JP); Taku Inoue, Kariya (JP); Junichi Iida, Kariya (JP); Ryuji Oide, Kariya (JP); Satoshi Morioka, Okazaki (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 473 days.

(21) Appl. No.: 17/389,921

(22) Filed: Jul. 30, 2021

(65) Prior Publication Data
US 2022/0069333 A1    Mar. 3, 2022

(30) Foreign Application Priority Data
Aug. 25, 2020    (JP) ................. 2020-141659

(51) Int. Cl.
*H01M 10/04* (2006.01)
*B60K 1/04* (2019.01)
(Continued)

(52) U.S. Cl.
CPC ........... *H01M 10/0418* (2013.01); *B60K 1/04* (2013.01); *H01M 4/02* (2013.01);
(Continued)

(58) Field of Classification Search
CPC ........ H01M 2004/029; H01M 10/0481; B60K 1/04
See application file for complete search history.

(56) References Cited

U.S. PATENT DOCUMENTS

2016/0372731 A1*  12/2016  Lee ................. H01M 10/647
2020/0067044 A1    2/2020  Hamaoka et al.
(Continued)

FOREIGN PATENT DOCUMENTS

CN    111201657 A    5/2020
JP    5028812 B2    9/2012
(Continued)

OTHER PUBLICATIONS

Office Action dated Mar. 10, 2022 from the Indian Intellectual Property Office in Application No. 202114037123.

*Primary Examiner* — Christopher P Domone
*Assistant Examiner* — Jonathan William Estes
(74) *Attorney, Agent, or Firm* — Sughrue Mion, PLLC

(57) ABSTRACT

The power storage device includes a power storage module and a conductive plate. The power storage module includes an electrode laminate including current collectors stacked on each other in a first direction. At least one of the positive electrode terminal electrode, the negative electrode terminal electrode, and the bipolar electrode includes an active material layer including grooves arranged in a second direction orthogonal to the first direction, and the grooves extend in a third direction crossing the second direction. The conductive plate includes an outer surface including depressions depressed in the first direction and extending in the second direction, the current collector arranged at the stack end of the electrode laminate includes an exposed face in contact with the outer surface, the exposed surface includes protrusions overlapping the active material layer in the first direction, and the protrusions protrude in the first direction and extend in the third direction.

20 Claims, 9 Drawing Sheets

(51) Int. Cl.
   *H01M 4/02*      (2006.01)
   *H01M 50/183*    (2021.01)
(52) U.S. Cl.
   CPC ..... *H01M 10/0481* (2013.01); *H01M 50/183* (2021.01); *H01M 2004/029* (2013.01); *H01M 2220/20* (2013.01)

(56) References Cited

U.S. PATENT DOCUMENTS

2020/0280029 A1* 9/2020 Nakamura ........ H01M 10/0468
2022/0359902 A1* 11/2022 Milobar ............. H01M 50/291

FOREIGN PATENT DOCUMENTS

| JP | 2019-220273 A | 12/2019 | |
|----|----|----|----|
| WO | 2018/159456 A1 | 9/2018 | |
| WO | WO-2019073791 A1 * | 4/2019 | ............. H01G 11/12 |

* cited by examiner

POWER STORAGE DEVICE

TECHNICAL FIELD

The present disclosure relates to a power storage device.

BACKGROUND

As a conventional power storage module, a battery module including a bipolar electrode in which a positive electrode layer is formed on one surface of a current collector and a negative electrode layer is formed on the other surface is known. Japanese Patent No. 5,028,812 discloses a battery module including a plurality of bipolar batteries having a plurality of bipolar electrodes stacked each other, and a pair of holding plates holding the plurality of bipolar batteries therebetween.

SUMMARY

When a battery pack is manufactured using the above-described power storage modules, a conductive plate or the like may be disposed between adjacent power storage modules. In this case, when an impact is applied to the assembled battery from the outside, the power storage module and the conductive plate may be misaligned from each other. As a result, when the contact area between the power storage module and the conductive plate decreases, the battery characteristics of the assembled battery may deteriorate.

An object of one aspect of the present disclosure is to suppress a decrease in battery characteristics due to misalignment between a power storage module and a conductive plate in a power storage device in which the power storage module and the conductive plate are stacked.

A power storage device according to an aspect of the present disclosure includes a power storage module, and a conductive plate stacked on the power storage module in a first direction. The power storage module and the conductive plate are configured to receive a restraint load along the first direction. The power storage module includes an electrode laminate including current collectors stacked in the first direction, and a sealing body provided to surround a side surface of the electrode laminate, the current collectors include a first current collector included in a negative terminal electrode, a second current collector included in a positive terminal electrode, and a third current collector included in a bipolar electrode provided between the negative terminal electrode and the positive terminal electrode. At least one of the positive terminal electrode, the negative terminal electrode, and the bipolar electrode includes an active material layer including grooves arranged in a second direction orthogonal to the first direction, each of grooves extends in a third direction intersecting the second direction when viewed from the first direction, the conductive plate includes an outer surface including depressions, the depressions being depressed in the first direction and extending in the second direction, a current collector disposed at a stacked end of the electrode laminate includes an exposed surface, the exposed surface being exposed from the sealing body and in contact with the outer surface of the conductive plate, the exposed surface includes protrusions overlapping the active material layer in the first direction, and the protrusions protrude in the first direction and extend in the third direction.

In this power storage device, the conductive plate is stacked on the power storage module in the first direction and includes an outer surface including depressions extending in the second direction. In addition, the current collector disposed at the stack end of the electrode laminate includes an exposed surface in contact with the outer surface of the conductive plate. The exposed surface includes protrusions protruding in the first direction and extending in the third direction. Therefore, depressions included in the outer surface and protrusions included in the exposed surface intersect each other when viewed from the first direction. Accordingly, for example, when the power storage device vibrates, depressions and protrusions collide with each other, so that favorable frictional force is generated. Therefore, even when an external impact is applied to the power storage device, the conductive plate is less likely to slip with respect to the power storage module. Therefore, according to one aspect of the present disclosure, it is possible to provide a power storage device capable of suppressing deterioration of battery characteristics due to misalignment between a power storage module and a conductive plate.

The conductive plate may be an extrusion molded body of a conductive material, and the depressions may include a recess provided in the outer surface and extending along an extrusion direction of the conductive material. In this case, since the roughness of the outer surface increases, the frictional force between the outer surface and the exposed surface increases.

The conductive plate may include a first main plate portion including the outer surface, a second main plate portion overlapping the first main plate portion in the first direction, and partition portions extending from one end of the outer surface to the other end of the outer surface in the second direction, arranged in the third direction, and connecting the first main plate portion and the second main plate portion, through holes may be provided by the first main plate portion, the second main plate portion, and the partition portions, each of the depressions may not overlap the partition portions in the first direction and may include a flexure in the first main plate portion, the flexure being located between a couple of the partition portions adjacent to each other, and the flexure may be bended toward the second main plate portion in the first direction. In this case, each flexure is provided so as to overlap the corresponding through hole. For example, in a case where each of the through holes is used as a flow path for the cooling fluid, variation in an area of each of the flow paths in contact with the protrusions is smaller than that in a case where a direction in which the protrusions extend is aligned with a direction in which the depressions extend. Therefore, it is possible to reduce variations in the cooling performance of the through holes.

The outer surface may further include a second recess provided on the outer surface, the second recess intersecting at least a part of the depressions, the conductive plate may include a first main plate portion including the outer surface, a second main plate portion overlapping the first main plate portion in the first direction, and partition portions extending from one end of the outer surface to the other end of the outer surface in the second direction, arranged in the third direction, and connecting the first main plate portion and the second main plate portion, through holes may be provided by the first main plate portion, the second main plate portion, and the plurality of partition portions, each of the depressions may not overlap the partition portions in the first direction, and may include a flexure in the first main plate portion, the flexure being located between a couple of the partition portions adjacent to each other, and the flexure may be bended toward the second main plate portion in the first direction. In this case, since the roughness of the outer surface increases, the frictional force between the outer surface and the exposed surface increases. In addition, each flexure is provided to overlap a corresponding through hole. For example, in a case where each of the through holes is used as a flow path for the cooling fluid, a variation in an area of each of the flow paths is in contact with the exposed surface is smaller than that in a case where a direction in which the protrusions extend is aligned with a direction in which the depressions extend. Therefore, it is possible to reduce variations in the cooling performance of the through holes.

The power storage device may further comprise a second power storage module located on an opposite side of the power storage module with the conductive plate interposed therebetween in the first direction, the second power storage module being in contact with the second main plate portion, the through holes may be exposed from a gap formed between the sealing body of the power storage module and a second sealing body included in the second power storage module in a second direction, and a diameter from one end of the through hole to the other end thereof in the first direction may be equal to or larger than an interval of the gap in the first direction. In this case, for example, when the cooling fluid flows into the through hole via a gap between the sealing body and the second sealing body, the pressure loss of the cooling fluid between the gap and the through hole can be reduced.

The exposed surface may be a roughened surface. In this case, since the roughness of the exposed surface is increased, the frictional force between the exposed surface and the outer surface is increased.

The current collector including an exposed surface may be the first current collector or the second current collector.

DETAILED DESCRIPTION

Hereinafter, one aspect of an embodiment according to the present disclosure will be described in detail with reference to drawings. In the description of the drawings, the same reference sign will be used for the same element or elements having the same function, and the elements will not be described repeatedly.

Figure 1:
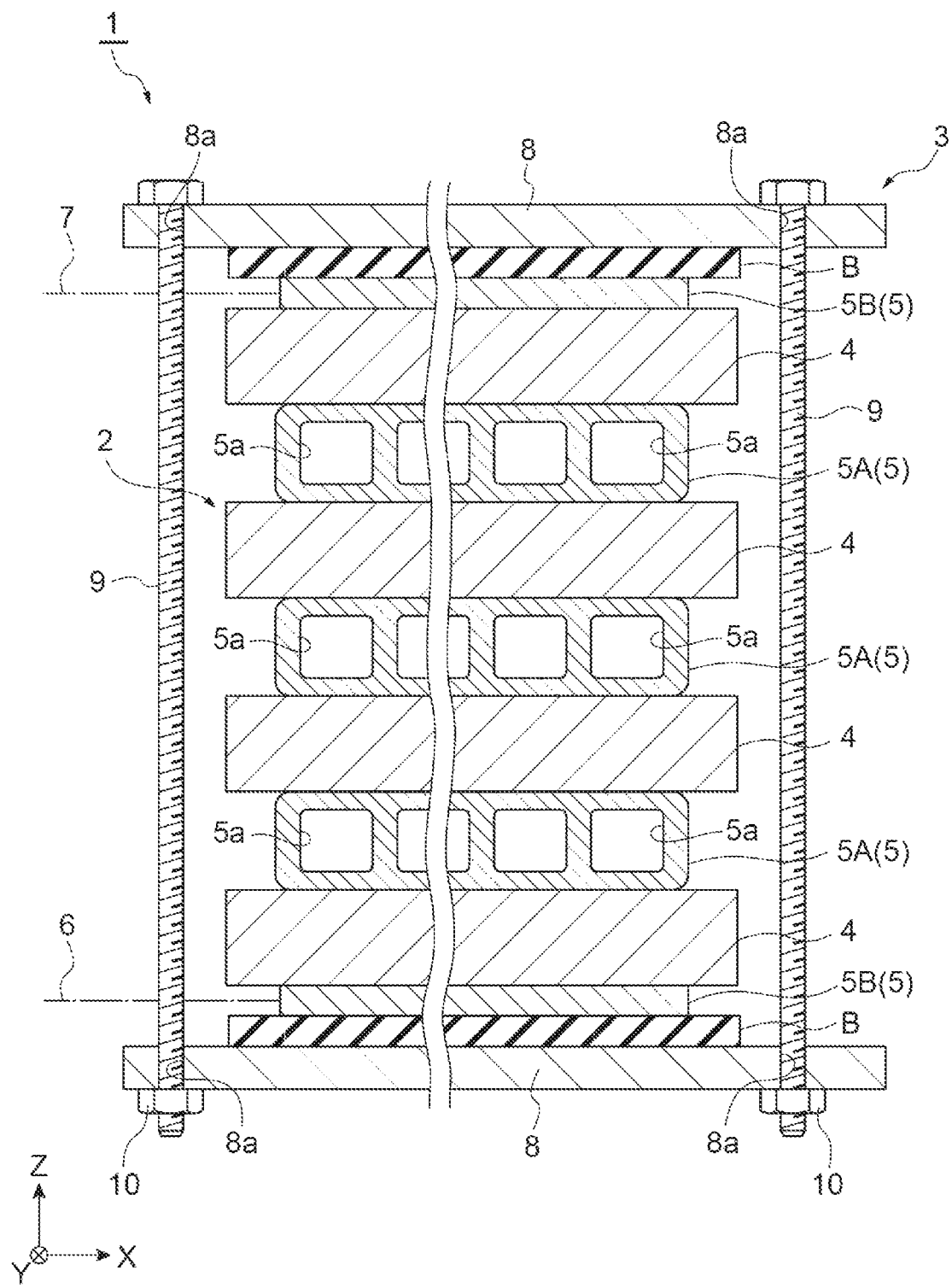
FIG. 1 is a schematic cross-sectional view illustrating an example of a power storage device.

FIG. 1 is a schematic sectional view showing an example of a power storage device according to the present embodiment. A power storage device 1 shown in FIG. 1 is used as a battery for a variety of vehicles, for example, a forklift, a hybrid vehicle, an electric vehicle, and the like. The power storage device 1 includes a module stack 2 including a plurality of stacked power storage modules 4 and a restraining member 3 configured to apply a restraining load to the module stack 2 in the stack direction of the module stack 2. In the following description, the stack direction of the module stack 2 will be defined as the Z direction (first direction), a direction orthogonal to the stack direction will be defined as the X direction (third direction), and a direction orthogonal to the stack direction and the first direction will be defined as the Y direction (second direction).

Figure 8:
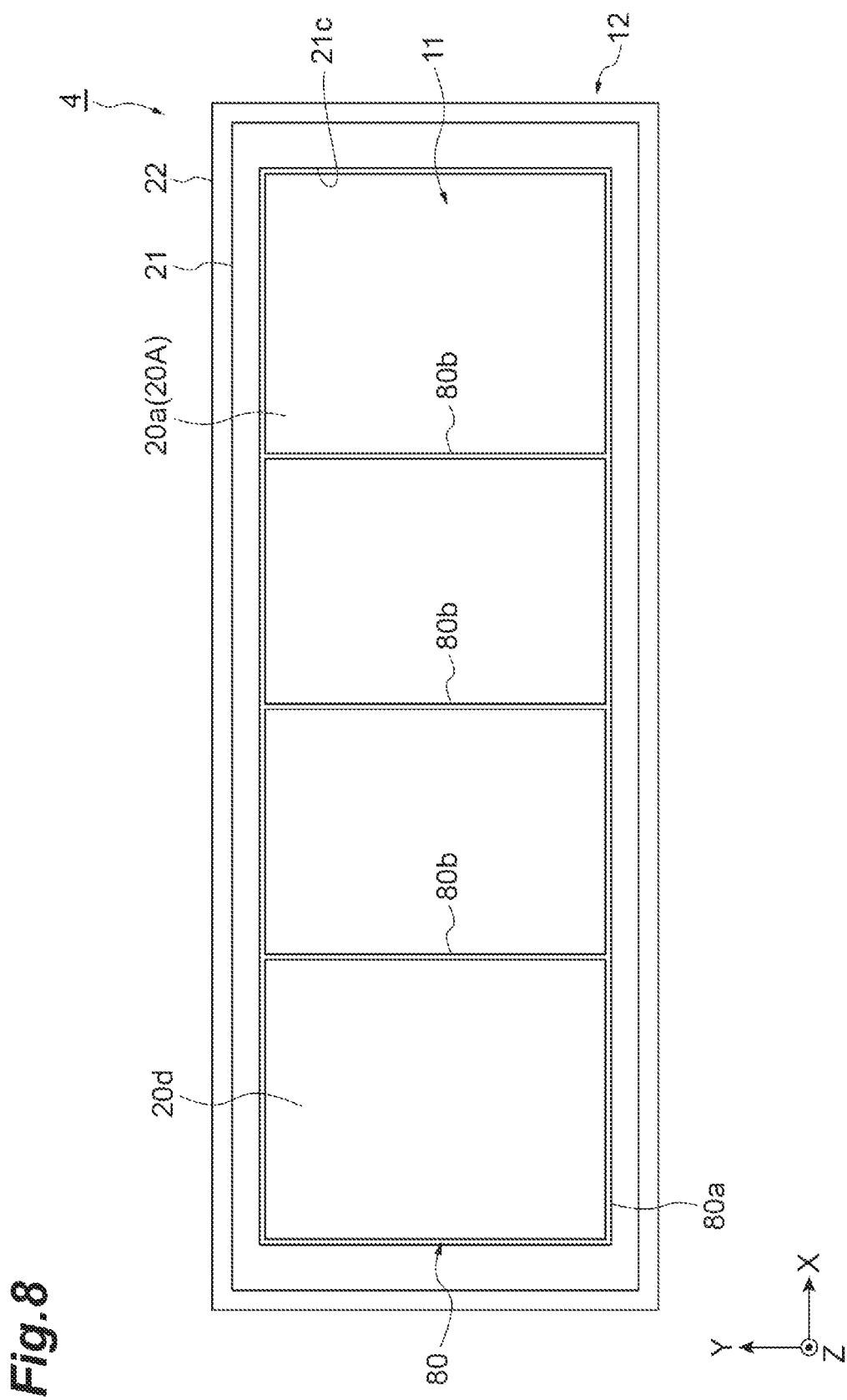
FIG. 8 is a plan view for explaining a position where a sealing member is provided.

The module stack 2 includes the power storage modules 4, conductive plates 5 disposed to be stacked with the power storage modules 4, a detection element 70 (refer to FIG. 4), and a sealing member 80 (refer to FIG. 8). The detection element 70 and the sealing member 80 will be described below. In the present embodiment, the module stack 2 includes a plurality of power storage modules 4 and a plurality of conductive plates 5. The number of the power storage modules 4 is, for example, five, and the number of the conductive plates 5 is, for example, four. The power storage module 4 is a bipolar battery and has a rectangular shape when seen in the Z direction. The power storage module 4 is, for example, at least one of a secondary battery, such as a nickel metal hybrid secondary battery or a lithium ion secondary battery, and an electric double layer capacitor. In the following description, as the power storage module 4, a nickel metal hybrid secondary battery will be exemplified.

The plurality of power storage modules 4 are stacked along the Z direction through the conductive plates 5 and are electrically connected in series in the Z direction. The conductive plate 5 is, for example, a plate member made of a conductive material such as metal. Examples of the material of the conductive plate 5 include aluminum. A plating layer of nickel or the like may be formed on the surface of the conductive plate 5. In an example shown in FIG. 1, the area of the conductive plate 5 seen in the Z direction is smaller than the area of the power storage module 4, however, it is not limited to this. For example, from the viewpoint of improving the heat dissipation property, the area of the conductive plate 5 may be the same as the area of the power storage module 4 or may be larger than the area of the power storage module 4.

The plurality of conductive plates 5 are made up of a plurality of (two in the present embodiment) conductive plates 5A disposed between the power storage modules 4 adjacent to each other in the Z direction and a plurality of (two in the present embodiment) conductive plates 5B positioned at the stack ends of the module stack 2. The power storage modules 4 adjacent to each other are electrically connected to each other through the conductive plate 5A. Insulating plates B are disposed outside the conductive plates 5B. A negative electrode terminal 7 is connected to one conductive plate 5B, and a positive electrode terminal 6 is connected to the other conductive plate 5B. The positive electrode terminal 6 and the negative electrode terminal 7 are each drawn, for example, from an edge portion of the conductive plate 5B in the X direction.

A plurality of through holes (flow paths) 5a configured to circulate a cooling fluid F (refer to FIG. 4, FIG. 5A and FIG. 5B) such as air are provided inside the conductive plate 5A disposed between the power storage modules 4. The plurality of through holes 5a configure a cooling mechanism for cooling the power storage modules 4. The conductive plate 5A has a function as a connection member configured to electrically connect the power storage modules 4 adjacent to each other. Moreover, the conductive plate 5A has a function as a heat sink configured to dissipate heat generated from the power storage modules 4. Specifically, the conductive plate 5A shows a function as a heat sink by transferring heat transferred from the power storage module 4 to the cooling fluid F passing through the plurality of through holes 5a.

The restraining member 3 includes a pair of end plates 8 configured to interpose the module stack 2 in the Z direction and fastening bolts 9 and nuts 10 configured to fasten the end plates 8. The end plate 8 has a rectangular shape when seen in the Z direction and is a plate-like conductive member having an area slightly larger than each of the area of the power storage module 4, the area of the conductive plate 5, and the area of the conductive plate 5B. Between the end plate 8 and the conductive plate 5B, the insulating plate B having an electrical insulation property is provided. This insulating plate B insulates the end plate 8 and the conductive plate 5B.

In the edge portions of the end plate 8, insertion holes 8a are provided at positions outside the module stack 2. The fastening bolt 9 is passed from the insertion hole 8a of one end plate 8 toward the insertion hole 8a of the other end plate 8. The nut 10 is screwed into the distal end portion of the fastening bolt 9 that protrudes from the insertion hole 8a of the other end plate 8. As a result, the power storage modules 4, the conductive plates 5A, and the conductive plates 5B are interposed by the end plates 8 and unitized as the module stack 2. In addition, a restraining load is applied to the module stack 2 (That is, the power storage modules 4 and the conductive plate 5) in the Z direction.

Figure 2:
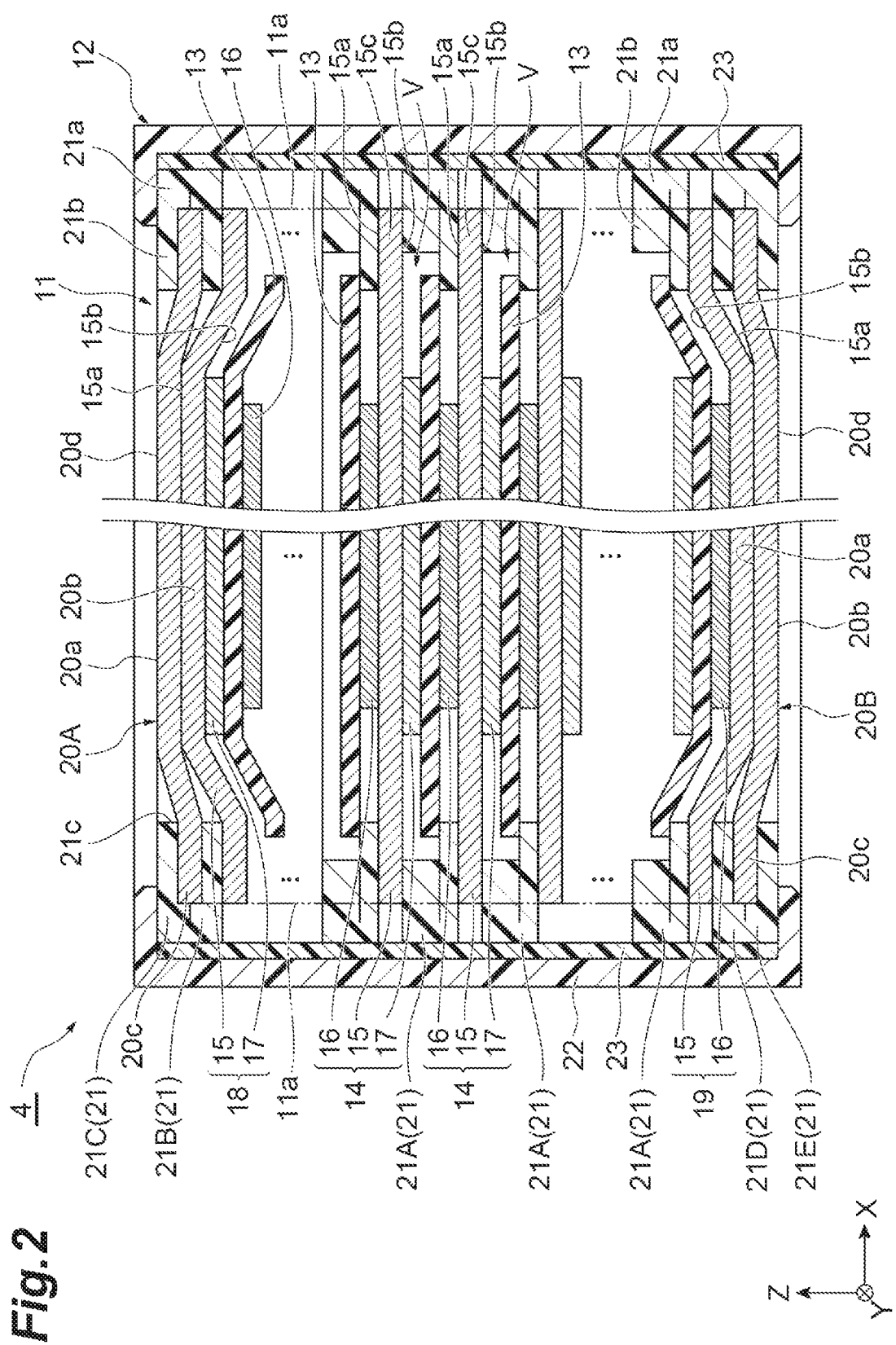
FIG. 2 is a cross-sectional view showing an internal configuration of the power storage module.

Next, the configuration of the power storage module 4 will be described in detail. FIG. 2 is a sectional view showing the internal configuration of the power storage module. As shown in FIG. 2, the power storage module 4 includes an electrode laminate 11 and resin sealing bodies 12 configured to seal the electrode laminate 11. The power storage module 4 is formed in, for example, a rectangular parallelepiped shape. In the present embodiment, when viewed from the Z direction, the dimension of the power storage module 4 along the X direction is longer than the dimension of the power storage module 4 along the Y direction.

The electrode laminate 11 includes a plurality of electrodes stacked each other in a stack direction (Z direction) through separators 13 and current collectors 20A and 20B disposed at the stack ends of the electrode laminate 11. The plurality of electrodes includes a laminate of a plurality of bipolar electrodes 14, a negative terminal electrode 18, and a positive terminal electrode 19. The laminate of the plurality of bipolar electrodes 14 is provided between the negative terminal electrode 18 and the positive terminal electrode 19.

The bipolar electrode 14 has a current collector 15 (third current collector) including a first surface 15a and a second surface 15b opposite to the first surface 15a, a positive electrode 16 provided on the first surface 15a, and a negative electrode 17 provided on the second surface 15b. The positive electrode 16 is a positive electrode active material layer formed by applying a positive electrode active material to the current collector 15. The negative electrode 17 is a negative electrode active material layer formed by applying a negative electrode active material to the current collector 15. In the electrode laminate 11, the positive electrode 16 in one bipolar electrode 14 opposes the negative electrode 17 in the other bipolar electrode 14 adjacent to the bipolar electrode in the Z direction with the separator 13 therebetween. In the electrode laminate 11, the negative electrode 17 in one bipolar electrode 14 opposes the positive electrode 16 in the other bipolar electrode 14 adjacent to one bipolar electrode in the Z direction with the separator 13 therebetween.

Figure 3:
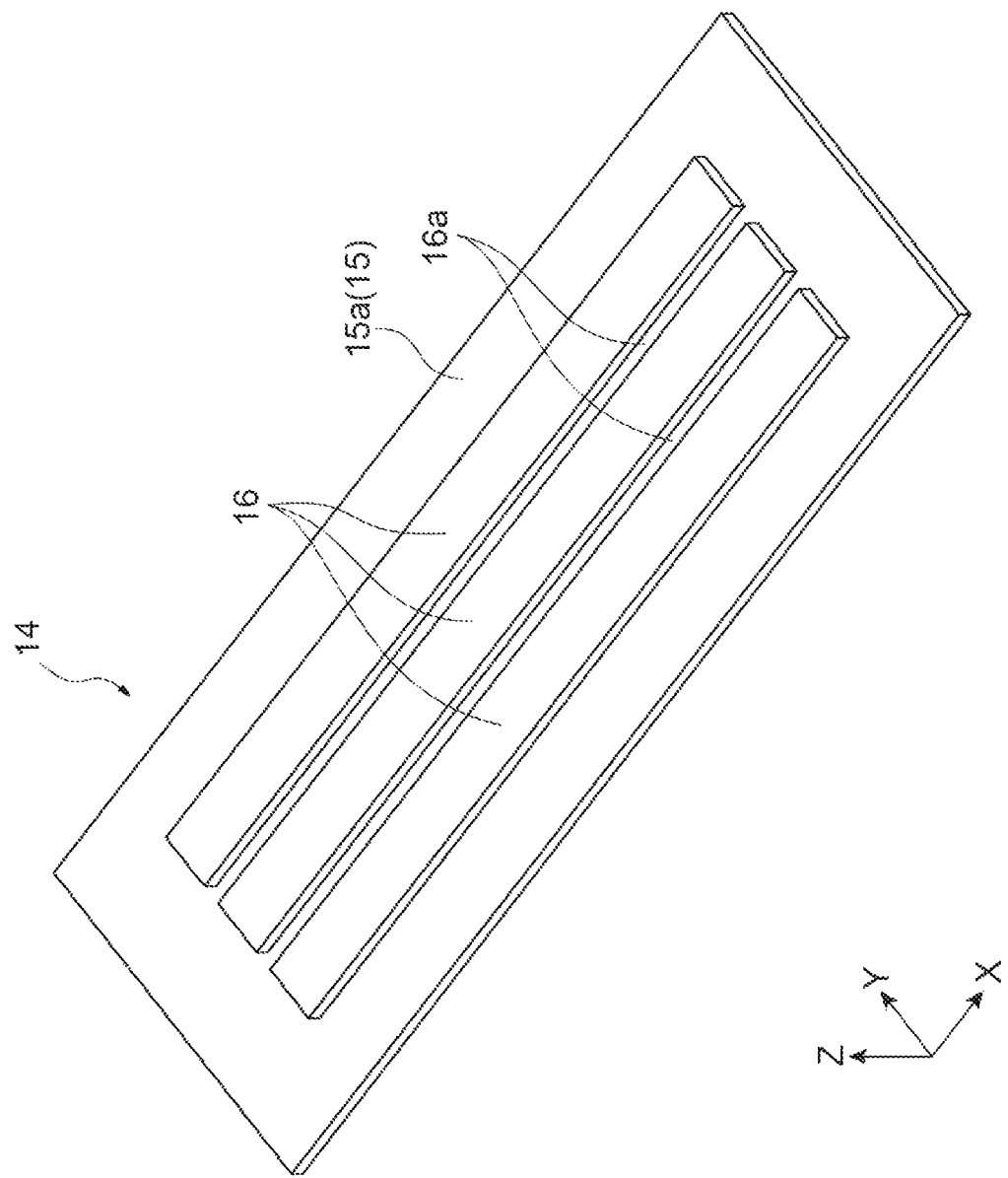
FIG. 3 is a schematic perspective view showing a bipolar electrode.

FIG. 3 is a schematic perspective view showing a bipolar electrode. As shown in FIG. 3, the positive electrode 16 is provided on the first surface 15a of the current collector 15. The positive electrode 16 includes a plurality of grooves 16a arranged in the Y direction and extending in the X direction. Each of the grooves 16a extends from one end side to the other end side of the current collector 15 in the X direction, and serves as a flow path of the electrolyte. The grooves 16a may extend in a linear shape, a wavy shape, or a curved shape. In the present embodiment, the bottom of each of the grooves 16a is formed by the first surface 15a of the current collector 15. Therefore, the positive electrode active material layer constituting the positive electrode 16 is divided into three by the grooves 16a, but is not particularly limited. For example, the positive electrode active material layer may be divided into five or more on the first surface 15a from the viewpoint of accuracy of injection of the electrolyte solution into the power storage module 4. Alternatively, the bottom of each of the grooves 16a may be formed by the positive electrode active material layer. In this case, the positive electrode 16 has a plurality of regions partitioned by the grooves 16a. By providing such a positive electrode 16, protrusions and depressions caused by the positive electrode 16 are formed along the Y direction on the first surface 15a of the current collector 15. When viewed from the Z direction, the position of the positive electrode 16 in each of the bipolar electrodes 14 is the same or substantially the same. The positive electrode 16 completely overlaps the negative electrode 17 in the Z direction.

The negative terminal electrode 18 includes a current collector 15 (first current collector) and a negative electrode 17 provided on the second surface 15b of the current collector 15. The shape and the number of the negative electrodes 17 provided in the negative electrode termination electrode 18 are equal to the shape and the number of the negative electrodes 17 provided in the bipolar electrode 14. The negative terminal electrode 18 is disposed on one end side in the Z direction such that the second surface 15b faces the center side in the Z direction of the electrode laminate 11. A current collector 20A is further stacked on the first surface 15a of the current collector 15 of the negative terminal electrode 18, and is electrically connected to one conductive plate 5 (see FIG. 1) adjacent to the power storage module 4 via the current collector 20A. The negative electrode 17 provided on the second surface 15b of the current collector 15 of the negative electrode termination electrode 18 faces the positive electrode 16 of the bipolar electrode 14 at one end in the Z direction via the separator 13.

The positive terminal electrode 19 includes a current collector 15 (second current collector) and a positive electrode 16 provided on the first surface 15a of the current collector 15. The shape of the positive electrode 16 provided in the positive electrode termination electrode 19 is equal to the shape of the positive electrode 16 provided in the bipolar electrode 14. Therefore, in the present embodiment, the positive electrode 16 provided in the positive electrode terminal electrode 19 has a plurality of grooves 16a and a plurality of divided positive electrode active material layers. The positive terminal electrode 19 is disposed on the other end side in the Z direction such that the first surface 15a faces the center side in the Z direction of the electrode laminate 11. A current collector 20B is further laminated on the second surface 15b of the current collector 15 of the positive terminal electrode 19, and is electrically connected to the other conductive plate 5 (see FIG. 1) adjacent to the power storage module 4 via the current collector 20B. The positive electrode 16 provided on the first surface 15a of the current collector 15 of the positive electrode terminal electrode 19 faces the negative electrode 17 of the bipolar electrode 14 at the other end in the Z direction via the separator 13.

The current collector 15 is a current collector such as a nickel plate or a nickel-plated steel plate. As an example, the current collector 15 is a rectangular nickel metal foil. Each current collector 15 is one of the current collectors included in the electrode laminate 11. An edge portion 15c of the current collector 15 has a rectangular frame shape and is a non-applied region to which neither a positive electrode active material nor a negative electrode active material is applied. Examples of the positive electrode active material that forms the positive electrode 16 include nickel hydroxide. Examples of the negative electrode active material that forms the negative electrode 17 include a hydrogen storage alloy. In the present embodiment, a region where the negative electrode 17 is formed on the second surface 15b of the current collector 15 is slightly larger than a region where the positive electrode 16 is formed on the first surface 15a of the current collector 15. The electrode laminate 11 includes current collectors 15, 20A, and 20B laminated on each other in the stack direction.

The separator 13 is a member that separates the positive electrode 16 and the negative electrode 17 facing each other to prevent a short circuit due to contact between both electrodes and allows charge carriers to pass therethrough, and is formed in a sheet shape, for example. Examples of the separator 13 include a porous film formed of a polyolefin-based resin such as polyethylene (PE) or polypropylene (PP), woven fabric or non-woven fabric formed of polypropylene, methyl cellulose, or the like, and the like. The separator 13 may be a separator reinforced with a vinylidene fluoride resin compound. It should be noted that the separator 13 is not limited to the sheet shape, and a separator having a bag shape may also be used.

The current collectors 20A and 20B are substantially the same members as the current collector 15, and are metallic plates such as nickel plates or nickel-plated steel plates. Any of the current collectors 20A and 20B is one of the current collectors included in the electrode laminate 11. As an example, the current collectors 20A and 20B are rectangular nickel metal foils. The current collectors 20A and 20B are non-applied electrodes in which neither a positive electrode active material layer nor a negative electrode active material layer is applied on a first surface 20a and a second surface 20b.

The current collector 20A (fourth current collector) is a current collector positioned at one stack end of the electrode laminate 11. In other words, the current collector 20A constitutes one end portion of the electrode laminate 11. The current collector 20A allows the negative terminal electrode 18 to be disposed between the current collector 20A and the bipolar electrode 14 along the Z direction. The current collector 20B is located at the other stack end of the electrode laminate 11. Due to the current collector 20B, the positive terminal electrode 19 is disposed between the current collector 20B and the bipolar electrode 14 along the Z direction.

The sealing body 12 is formed of, for example, an insulating resin in a rectangular cylindrical shape as a whole. The sealing bodies 12 are provided to surround side surfaces 11a of the electrode laminate 11. The sealing bodies 12 hold the edge portions 15c on the side surfaces 11a. The sealing body 12 has a plurality of frame shaped first sealing portions 21 (a plurality of frame bodies) respectively provided at the edge portions of the current collectors included in the electrode laminate 11 (that is, the edge portions 15c of the current collectors 15 and the edge portions 20c of the current collectors 20A and 20B) and a second sealing portion 22 that surrounds the first sealing portions 21 from the outside along the side surface 11a and is bonded to each of the first sealing portions 21. The first sealing portions 21 and the second sealing portion 22 are made of, for example, an alkali-resistant insulating resin. Examples of the resin include polypropylene (PP), polyphenylene sulfide (PPS), modified polyphenylene ether (modified PPE), and the like.

The first sealing portion 21 is continuously provided throughout the entire circumference of at least the edge portion 15c of the current collector 15 and the edge portion 20c of the current collector 20A or 20B and has a rectangular frame shape when seen in the Z direction. The first sealing portion 21 is welded to the edge portion 15c of the current collector 15 or the edge portion 20c of the current collector 20A or 20B by, for example, at least one of ultrasonic waves and heat and is airtightly joined. The first sealing portion 21 includes an outer portion 21a that overhangs outside more than the edge of the current collector 15 or the current collector 20A or 20B and an inner portion 21b positioned inside the edge of the current collector 15 or the current collector 20A or 20B. A welding layer 23 is provided at a distal end portion (outer edge portion) of the outer portion 21a of the first sealing portion 21. The first sealing portion 21 is adhered to the second sealing portion 22 via the welding layer 23. The welding layer 23 is formed by bonding the distal end portions of the first sealing portions 21 melted by various welding methods such as hot plate welding, ultrasonic welding, and infrared welding.

The plurality of first sealing portions 21 has a plurality of first sealing portions 21A provided on the bipolar electrodes 14 and the positive terminal electrode 19, a first sealing portion 21B provided on the negative terminal electrode 18, a first sealing portion 21C provided on the current collector 20A, and first sealing portions 21D and 21E provided on the current collector 20B.

The first sealing portions 21A are joined to the first surfaces 15a of the current collectors 15 of the bipolar electrodes 14 and the positive terminal electrode 19. The inner portion 21b of the first sealing portion 21A is positioned between the edge portions 15c of the current collectors 15 adjacent to each other in the Z direction. A region where the edge portion 15c on the first surface 15a of the current collector 15 and the first sealing portion 21A overlap each other forms a bonding region between the current collector 15 and the first sealing portion 21A when seen from the Z direction.

In the present embodiment, the first sealing portion 21A has a bilayer structure formed by folding a film in half. The outer edge portion of the first sealing portion 21A joined to the first sealing portion 22 is the folded portion (bent portion) of the film. The film in the first layer that configures the first sealing portion 21A is joined to the first surface 15a. The inner edge of the film in the second layer is positioned outside the inner edge of the film in the first layer and forms a stepped portion on which the separator 13 is placed. The inner edge of the film in the second layer is positioned inside the edge of the current collector 15.

The first sealing portion 21B is joined to the first surface 15a of the current collector 15 of the negative terminal electrode 18. The inner portion 21b of the first sealing portion 21B is positioned between the edge portion 15c of the current collector 15 of the negative terminal electrode 18 and the edge portion 20c of the current collector 20A adjacent to each other in the Z direction. A region where the edge portion 15c on the first surface 15a of the current collector 15 and the inner portion 21b of the first sealing portion 21B overlap each other forms a bonding region between the current collector 15 and the first sealing portion 21B. The first sealing portion 21B is also joined to the second surface 20b of the current collector 20A. A region where the edge portion 20c on the second surface 20b of the current collector 20A and the first sealing portion 21B overlap each other forms a bonding region between the current collector 20A and the first sealing portion 21B. In the present embodiment, the first sealing portion 21B is also joined to the edge portion 20c on the second surface 20b of the current collector 20A.

The first sealing portion 21C is joined to the first surface 20a of the current collector 20A. In the present embodiment, the first sealing portion 21C is located closer to one end side in the Z direction than all the other first sealing portions 21 the first sealing portion 21C is, among the plurality of first sealing portions 21, the first sealing portion positioned on one end side in the Z direction. A region where the edge portion 20c on the first surface 20a of the current collector 20A and the first sealing portion 21C overlap each other forms a bonding region between the current collector 20A and the first sealing portion 21C.

In the present embodiment, the outer edge portions of the first sealing portions 21B and 21C embedded in the second sealing portion 22 are continuous with each other. That is, the first sealing portions 21B and 21C are formed of a film folded in half with the edge portion 20c of the current collector 20A interposed therebetween. The outer edge portion of the first sealing portions 21B and 21C is the folded portion (bent portion) of the film. The film that configures the first sealing portions 21B and 21C is joined to the edge portion 20c on both the first surface 20a and the second surface 20b of the current collector 20A. As described above, both surfaces of the current collector 20A are joined to the first sealing portions 21B and 21C, whereby it is possible to suppress the seepage of the electrolytic solution attributed to a so-called alkaline creep phenomenon.

The first sealing portion 21D is joined to the first surface 20a of the current collector 20B. The inner portion 21b of the first sealing portion 21D is positioned between the edge portion 15c of the current collector 15 of the positive terminal electrode 19 and the edge portion 20c of the current collector 20B adjacent to each other in the Z direction. A region where the edge portion 20c on the first surface 20a of the current collector 20B and the first sealing portion 21D overlap each other forms a bonding region between the current collector 20B and the first sealing portion 21D.

The first sealing portion 21E is disposed at the edge portion 20c on the second surface 20b of the current collector 20B. In the present embodiment, the first sealing portion 21E is located closer to the other end side in the Z direction than all the other first sealing portions 21. In addition, in the present embodiment, the first sealing portion 21E is not joined to the current collector 20B.

The current collector 20A positioned at the stack end has an exposed surface 20d exposed from the first sealing portion 21. In the present embodiment, the central region of the first surface 20a of the current collector 20A corresponds to the exposed surface 20d exposed from the first sealing portion 21C. The second surface 20b of the current collector 20B has an exposed surface 20d exposed from the first sealing portion 21E. The exposed surface 20d includes a contact region that is in contact with (abuts against) and electrically connected to the first surface 5f (see FIG. 4) of the conductive plate 5 and a non-contact region that is not in contact with (abuts against) the conductive plate 5.

In the present embodiment, the outer edge portions of the second sealing portions 21D and 21E joined to the first sealing portion 22 are continuous with each other. That is, the first sealing portions 21D and 21E are formed by folding one films in half with the edge portion 20c of the current collector 20B interposed therebetween. The outer edge portions of the first sealing portions 21D and 21E are folded portions (bent portions) of the film. The film constituting the first sealing portions 21D and 21E is joined to the edge portion 20c on the first surface 20a of the current collector 20B.

Each of the current collectors 20A and 20B overlaps the positive electrode 16 provided in each of the bipolar electrode 14 and the positive electrode termination electrode 19 in the Z direction. Further, as described above, in the electrode laminate 11, the central region of the electrode laminate 11 bulges in the Z direction as compared with the surrounding region. At this time, the exposed surface 20d of at least one of the current collectors 20A and 20B is provided with unevenness caused by the positive electrode 16 laminated in the Z direction. That is, at least one of the exposed surface 20d of the current collector 20A and the exposed surface 20d of the current collector 20B has a plurality of protrusions 91 (see FIG. 9) extending in the X direction and overlapping the positive electrode active material layer. The plurality of protrusions 91 are part of the unevenness (first unevenness) provided on the exposed surface 20d, protrude in the Z direction, are arranged in the Y direction, and are separated from each other. The protruded amount of each protrusion 91 along the Z direction is not particularly limited, but is, for example, equal to or greater than the thickness of the positive electrode 16.

In the coupling region, the surfaces of the current collectors 15,20A and 20B are roughened. The roughened region may be only the bonding region, but in the present embodiment, the entire first surface 15a of the current collector 15 is roughened. The whole of first surface 20a and the second surface 20b of the current collector 20A are roughened. The entire first surface 20a of the current collector 20B is roughened. For example, the exposed surface 20d included in the first surface 20a of the current collector 20A may be roughened by forming a plurality of protrusion-shaped plating structures, or may be roughened by performing rubbing treatment or the like. Therefore, the exposed surface 20d is provided with irregularities due to the plurality of protrusion-shaped plating structures in addition to the irregularities due to the protrusions 91.

The roughening of the current collector 20A can be realized by, for example, subjecting a current collector to an electrolytic plating treatment to form a plurality of fine projections thereon. Since the plurality of fine projections are formed in the bonding region, the resins in a molten state in the bonding step enter between the plurality of fine projections formed by roughening at the bonding interface between each of the current collectors 15A, 20A, 20B and the first sealing portion 21 in the bonding region. Then, the resin is cooled and solidified in a state of entering between the plurality of fine protrusions. Therefore, an anchor effect is exhibited, and the resin-made first sealing portion 21 is prevented from being separated from each of the current collectors 15A, 20A, and 20B. Accordingly, the coupling strength between the current collectors 15,20A and 20B and the first sealing portion 21 may be improved. The projections formed at the time of roughening have, for example, a shape in which the projections become thicker from the proximal end side toward the distal end side. As a result, the cross-sectional shape between adjacent protrusions becomes an undercut shape, and the anchor effect can be enhanced. In addition, the frictional force between the contact region 20e of the exposed surface 20d and the conductive plate 5 in contact with the contact region 20e is increased. For example, the coefficient of static friction between the exposed surface 20d of the current collector 20A and the conductive plate 5 is about 0.5 or more.

The second sealing portions 22 are provided outside the electrode laminate 11 and the first sealing portions 21 to surround the side surfaces 11a of the electrode laminate 11 and configure the outer walls (housing) of the power storage module 4. The second sealing portions 22 are formed by, for example, the injection molding of a resin and extend along the Z direction throughout the entire length of the electrode laminate 11. The second sealing portion 22 has a rectangular frame shape extending along the Z direction as the axial direction. The second sealing portion 22 is compatible with and integrated with a part of the first sealing portion 21 melted by heat during injection molding, for example.

The sealing body 12 forms an internal space V between the electrodes adjacent to each other and seals the internal space V. More specifically, the second sealing portions 22 seal, together with the first sealing portions 21, spaces between the bipolar electrodes 14 adjacent to each other along the Z direction, spaces between the negative terminal electrode 18 and the bipolar electrode 14 adjacent to each other along the Z direction, and spaces between the positive terminal electrode 19 and the bipolar electrode 14 adjacent to each other along the Z direction, respectively. Therefore, airtightly partitioned internal spaces V are formed between the bipolar electrodes 14 adjacent to each other, between the negative terminal electrode 18 and the bipolar electrode 14, and between the positive terminal electrode 19 and the bipolar electrode 14, respectively. In these internal spaces V, for example, an electrolytic solution (not shown) containing an alkali solution such as an aqueous potassium hydroxide solution is accommodated. The separators 13, the positive electrodes 16, and the negative electrodes 17 are impregnated with the electrolytic solution. The sealing body 12 also seals the portion between the current collector 20A and the negative terminal electrode 18 and the portion between the current collector 20B and the positive terminal electrode 19, respectively.

Figure 4:
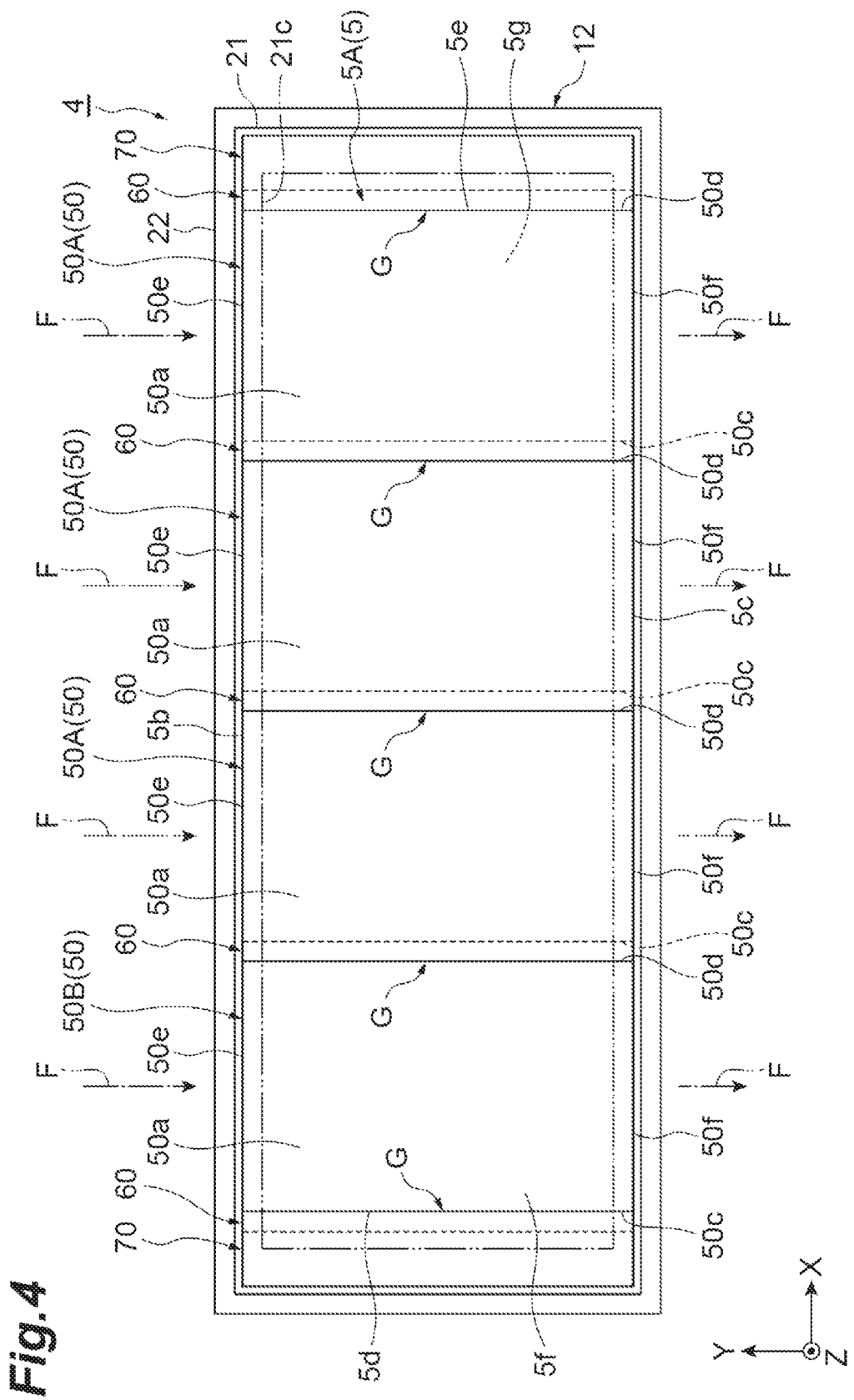
FIG. 4 is a plan view showing a power storage module and a conductive plate on the power storage module.

Next, the detailed configuration of the above-described conductive plate 5 will be described. FIG. 4 is a plan view showing the power storage module 4 and the conductive plate 5A on the power storage module 4. As shown in FIG. 4, the conductive plate 5A has a rectangular shape having an area slightly smaller than the planar shape of the power storage module 4 when seen in the Z direction (that is, in a plan view). The conductive plate 5A is positioned in the frame of the second sealing portions 22. In the present embodiment, the conductive plate 5A has a rectangular shape including a pair of a long side 5b and a long side 5c and a pair of a short side 5d and a short side 5e. The pair of the long side 5b and the long side 5c extend along the X direction and oppose each other in the Y direction. The pair of the short side 5d and the short side 5e extend along the Y direction and oppose each other in the X direction.

In the present embodiment, the pair of the long side 5b and the long side 5c and the pair of the short side 5d and the short side 5e configure the outer edge of the conductive plate 5A. The pair of the long side 5b and the long side 5c overlap the first sealing portions 21 when seen in the Z direction. The pair of the short side 5d and the short side 5e do not overlap the first sealing portions 21 when seen in the Z direction. The first sealing portions 21 disposed on the pair of the short side 5d and the short side 5e side are provided to extend inward more than the first sealing portions 21 disposed on the pair of the long side 5b and the long side 5c side when seen from the Z direction. The lengths in the X direction of the first sealing portions 21 disposed on the pair of the short side 5d and the short side 5e side are longer than the lengths in the Y direction of the first sealing portions 21 disposed on the pair of the long side 5b and the long side 5c side.

The conductive plate 5A further includes a first surface 5f and a second surface 5g in the thickness direction (Z direction). The first surface 5f is in contact with the current collector 20B disposed at the stack end of the power storage module 4 adjacent to the conductive plate 5A on one side in the Z direction. The second surface 5g is in contact with the current collector 20A disposed at the stack end of the power storage module 4 adjacent to the conductive plate 5A on the other side in the Z direction. As described above, in the electrode laminate 11, the central region of the electrode laminate 11 is expanded in the Z direction compared with the surrounding region. Thus, the central regions of the first surface 5f and the second surface 5g abut the central regions of the first surface 20a of the current collector 20A and the second surface 20b of the current collector 20B. The conductive plates 5A are disposed in contact with the current collectors 20A and 20B disposed at the stack ends of the power storage modules 4 adjacent to the conductive plates 5A and electrically connect the plurality of power storage modules 4 in series.

Detection elements 70 are connected to end surfaces of the conductive plates 5A in the X direction, respectively. Examples of the detection element 70 include an element configured to detect the temperature of the power storage module 4 and an element configured to detect the voltage output from the power storage module 4, and the detection element 70 is a sensor configured to monitor the state of the power storage module 4. The detection element 70 is formed of, for example, an alkali-resistant insulating resin such as polypropylene (PP) in the same thickness as the conductive plate 5A.

The conductive plate 5A has a plurality of (four in the present embodiment) plate members 50 arranged along the X direction and coupled to each other. Each plate member 50 has a rectangular shape when seen in the Z direction (that is, in a plan view). In the present embodiment, each plate member 50 has a rectangular shape including a pair of long sides along the Y direction and a pair of short sides along the X direction when seen in the Z direction. The individual plate members 50 are arranged along the X direction such that the long sides of the plate members 50 adjacent to each other face each other in the X direction.

The plate member 50 includes a first surface 50a and a second surface 50b in the thickness direction (Z direction). The first surface 50a is an outer surface configuring a part of the first surface 5f. The second surface 50b is an outer surface configuring a part of the second surface 5g. The plate member 50 is, for example, an extrusion molded body of a conductive material such as aluminum. In this case, the conductive material of the plate member 50 is extruded along the predetermined direction. In this embodiment, the conductive material is extruded along the Y direction. That is, the extrusion direction of the conductive material corresponds to the Y direction. Accordingly, processing marks extending mainly in the Y direction are formed on a part of the surface of the plate member 50. Therefore, although not illustrated, at least one of the first surface 50a and the second surface 50b has one or a plurality of recesses (scratches, depressions) recessed in the Z direction and extending in the Y direction, the recesses corresponding to the processing marks. The recess may be formed not only on at least one of the first surface 50a and the second surface 50b but also on any surface of the plate member 50. For example, the recess is provided on the surface of the plate member 50 that forms the through hole 5a. For example, the recesses are provided on surfaces of bended portions (bends) in the first main plate portion 51 described later (and surfaces of bended portions of the second main plate portion 52).

The plate member 50 further includes a pair of an end surface 50c and an end surface 50d that oppose each other in the X direction and a pair of an end surface 50e and an end surface 50f that oppose each other in the Y direction. Each of the end surface 50c and the end surface 50d is a flat surface including the long side of the plate member 50 and is along the YZ plane. Each of the end surface 50c and the end surface 50d extends along the Y direction. The end surface 50c is positioned on the short side 5d side in the X direction, and the end surface 50d is positioned on the short side 5e side in the X direction. Between the couple of plate members 50 adjacent to each other in the X direction, the end surface 50c of one plate member 50 and the end surface 50d of the other plate member 50 face each other in the X direction. In other words, one plate member 50 has an end surface 50c facing the other plate member 50 in the X direction, and the other plate member 50 has an end surface 50d facing the one plate member 50 in the X direction.

Each of the end surface 50e and the end surface 50f is a flat surface including the short side of the plate member 50 and is along the XZ plane. Each of the end surface 50e and the end surface 50f extends along the X direction. The end surface 50e is positioned on the long side 5b side and connects one end of the end surface 50c and one end of the end surface 50d in the Y direction. The end surface 50f is positioned on the long side 5c side and connects the other end of the end surface 50c and the other end of the end surface 50d in the Y direction. In the individual plate members 50, the positions of the individual end surfaces 50e in the Y direction are aligned with each other, and the positions of the individual end surfaces 50f in the Y direction are aligned with each other.

The plurality of plate members 50 are constituted by a plurality of (three in the present embodiment) plate members 50A and one plate member 50B. In the present embodiment, the plate member 50B is disposed on the short side 5d side of the plurality of plate members 50A. The end surface 50c of the plate member 50B disposed closest to the short side 5d constitutes the short side 5d of the conductive plate 5A. The end surface 50d of the plate member 50A disposed closest to the short side 5e constitutes the end surface of the conductive plate 5A.

Figure 5A:
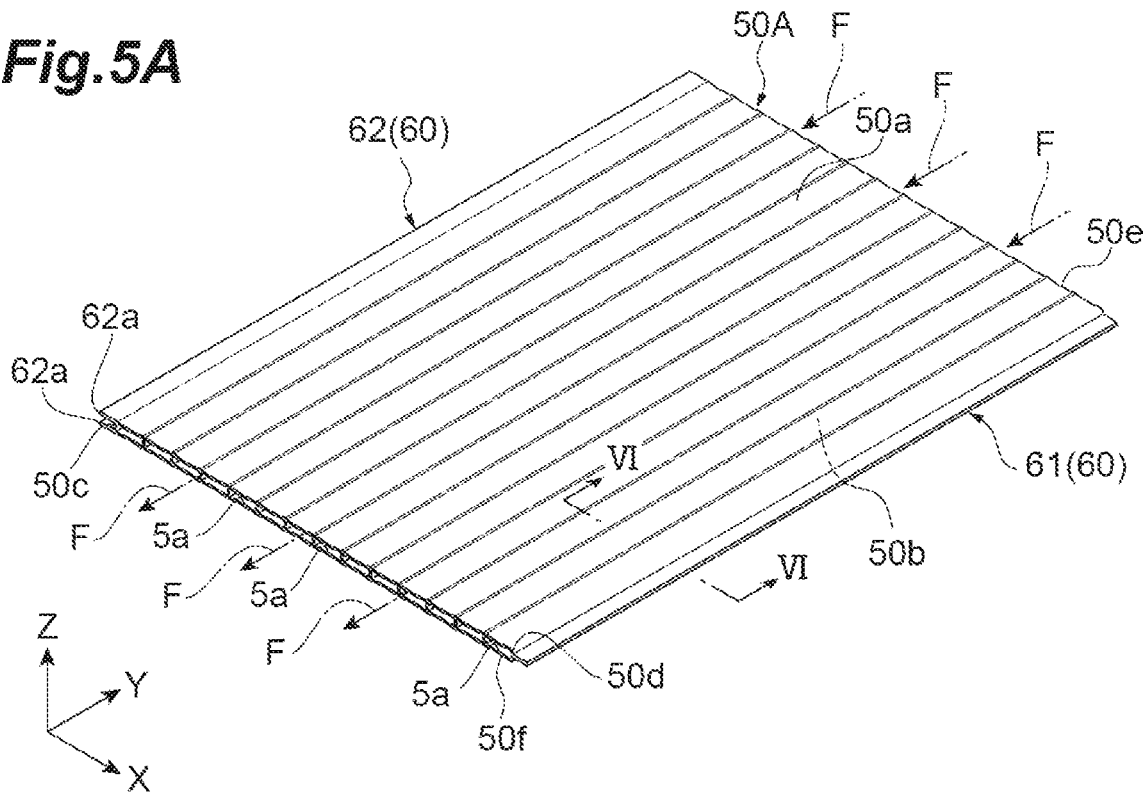
FIGS. 5A and 5B are perspective views of the plate-shaped member of the conductive plate.
Figure 6:
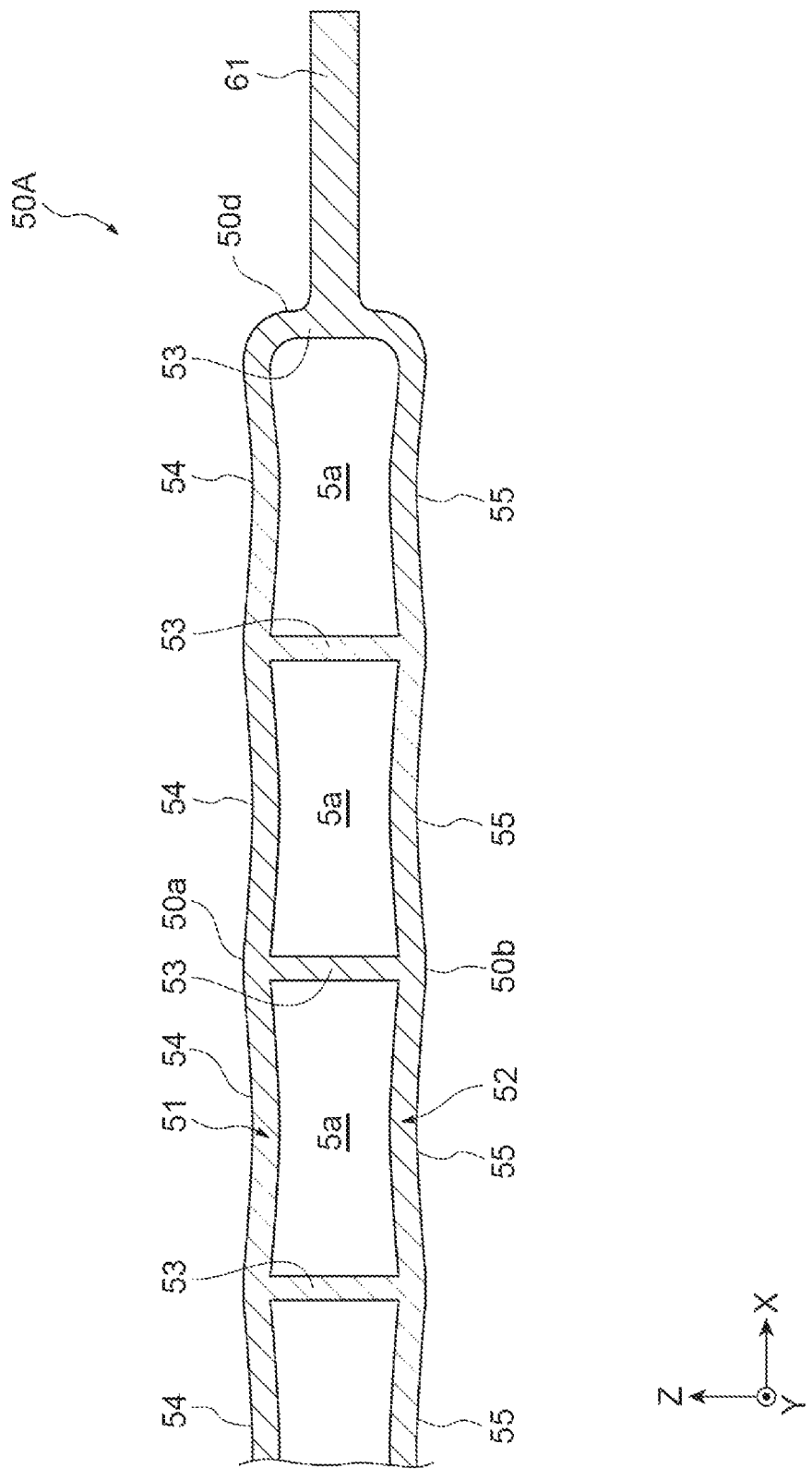
FIG. 6 is an enlarged cross-sectional view taken along line VI-VI shown in FIG. 5A.

FIG. 5A is a perspective view of the plate member 50A of the conductive plate 5A. FIG. 6 is an enlarged cross-sectional view taken along line VI-VI shown in FIG. 5A. As shown in FIGS. 5A and 6, the plate member 50A includes a first main plate portion 51, a first main plate portion 52 overlapping the second main plate portion 51 in the direction Z, and a plurality of partition portions 53. The thickness of the plate member 50A along the Z direction is, for example, about 4 mm.

The first main plate portion 51 is a plate-shaped portion constituting one end of the plate member 50A in the Z direction, and includes a first surface 50a. A thickness of the first main plate portion 51 (dimension along the Z direction) is, for example, about 0.5 mm. The first main plate portion 51 constitutes one end of the plurality of through holes 5a in the Z direction. A plurality of depressions 54 are provided on the first surface 51a of the first main plate portion 51. Therefore, the first main plate portion 51 is provided with unevenness (second unevenness) including the depressions 54. Each depression 54 extends in the Y direction when viewed from the Z direction, and is depressed in a substantially semi-elliptical shape in the Z direction. The depressed amount of the depression 54 along the Z direction is, for example, 0.01 mm or more and 1.0 mm or less. In the present embodiment, each depression 54 extends from the end surface 50e to the end surface 50f of the plate member 50A. Each depression 54 is provided at a position not overlapping the partition portion 53 in the Z direction. In the present embodiment, at least a part of the depression 54 is formed by bending a portion of the first main plate portion 51 located between a couple of partition portions 53 adjacent to each other. In the present embodiment, the depression 54 includes the recess (flaw) provided in the first surface 50a of the first main plate portion 51, and the flexure positioned between the couple of partition portions 53 adjacent to each other. The flexure is performed toward the second main plate portion 52 in the Z direction.

The second main plate portion 52 is a plate-shaped portion constituting the other end of the plate member 50A in the Z direction, and includes the second surface 50b. Thickness of the second main plate portion 52 (dimension along the Z direction) is, for example, about 0.5 mm. The second main plate portion 52 constitutes the other end of the plurality of through holes 5a in the Z direction. A plurality of depressions 55 are provided on the second surface 52b of the second main plate portion 52. Therefore, the second main plate portion 52 is provided with irregularities including the depressions 55. Each depression 55 extends in the Y direction when viewed from the Z direction, and is depressed in a substantially semi-elliptical shape when viewed from the Y direction. The depressed amount of the depression 55 along the Z direction is, for example, 0.01 mm or more and 1.0 mm or less. Each of the depressions 55 extends from the end surface 50e to the end surface 50f of the plate member 50A in the same manner as the depressions 54, and overlaps any of the plurality of depressions 54 in the Z direction. Each depression 55 is provided at a position not overlapping the partition portion 53 in the Z direction. In the present embodiment, the depression 55 is formed by bending a portion of the second main plate portion 52 located between a couple of partition portions 53 adjacent to each other. In other words, the depression 55 includes the recess (flaw) provided on the second surface 52b of the second main plate portion 52 and the flexure positioned between the couple of partition portions 53 adjacent to each other. The flexure is performed toward the first main plate portion 51 in the Z direction.

The plurality of partition portions 53 are portions that support forces along the Z direction applied to the plate member 50A, and are positioned between the first main plate portion 51 and the second main plate portion 52 in the Z direction. The plurality of partition portions 53 extend from one end to the other end of the first surface 50a in the direction Y, are arranged in the direction X, and connect the first main plate portion 51 and the second main plate portion 52. The length of the partition portion 53 along the Z direction is, for example, about 3 mm. The thickness of the partition portion 53 along the X direction is, for example, about 0.5 mm. A distance between a couple of partition portions 53 adjacent to each other in the X direction is, for example, about 8.6 mm. This distance corresponds to the diameter from one end to the other end of the through hole 5a in the X direction. The plurality of partition portions 53 constitute one end or the other end of the plurality of through holes 5a in the X direction. A part of the partition portion 53 includes the end surface 50c or the end surface 50d.

The plate member 50A is formed with the plurality of through holes 5a described above. The through-holes 5a are arranged along the X direction and penetrate the inside of the plate member 50A. Each through hole 5a is provided by the first main plate portion 51, the second main plate portion 52, and a couple of partition portions 53 adjacent to each other among the plurality of partition portions 53. Therefore, the through hole 5a and the depressions 54,55 overlap each other in the Z direction. Each through hole 5a extends from the end surface 50e to the end surface 50f of the plate member 50A. The cross-sectional shape of each through hole 5a is, for example, a rectangular shape whose longitudinal direction is the X direction when viewed from the Y direction. The cooling fluid F flows through the through holes 5a. The cooling fluid F flowing through each through hole 5a is directed from the end surface 50e to the end surface 50f of the plate members 50A and 50B in the Y direction, for example.

Figure 7:
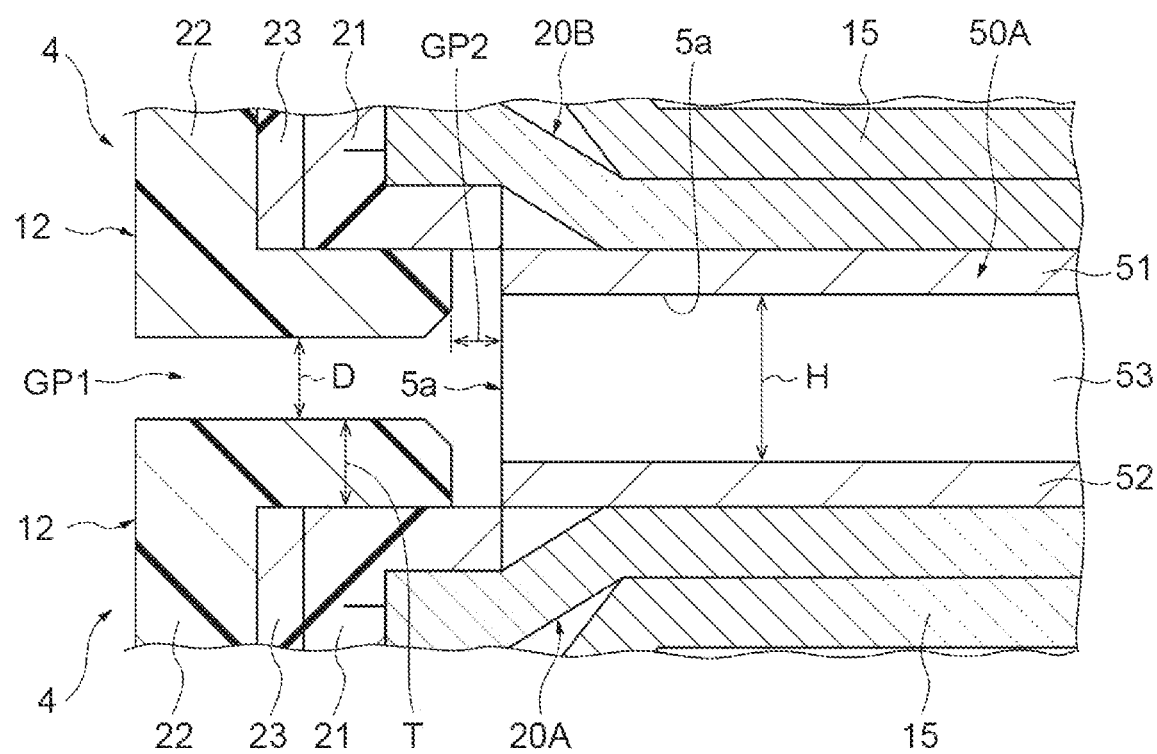
FIG. 7 is an enlarged schematic cross-sectional view of a part of the module stack.

FIG. 7 is an enlarged schematic cross-sectional view of a part of the module stack. FIG. 7 shows a part of a couple of power storage modules 4 adjacent to each other in the Z direction and a part of the plate member 50A positioned between the a couple of power storage modules 4. In the Z direction, the clearance GP1 between the sealing body 12 (particularly, the second sealing portion 22) of one power storage module 4 and the sealing body 12 (particularly, the second sealing portion 22) of the other power storage module 4 is the narrowest. When viewed from the Y direction, at least a part of each through hole 5a is exposed from the gap GP1. Therefore, the cooling fluid F (see FIG. 4 and the like) flows into each through hole 5a via the gap GP1. Although not shown in the present embodiment, the center line of the gap GP1 along the Y direction and the center line of the through hole 5a along the Y direction overlap each other. In addition, a diameter H from one end to the other end of the through hole 5a along the Z direction corresponds to the height of the partition portion 53 and is about 3 mm. Therefore, from the viewpoint of reducing the pressure loss of the cooling fluid F, the diameter H of the through hole 5a along the Z direction is set to be equal to or larger than the dimension D of the narrowest portion of the gap GP1 along the Z direction. Therefore, in the present embodiment, the dimension D along the Z direction is 0.5 mm or more and 3 mm or less.

In the second sealing portion 22 of the sealing body 12, a portion located outside the current collector 20A in the Z direction is thicker than the first main plate portion 51 and the second main plate portion 52 of the plate member 50A. The thickness T is, for example, 0.5 mm or more and 1.5 mm or less. Therefore, when viewed from the Y direction, the first main plate portion 52 of the plate member 50A is hidden by the sealing body 12 of one power storage module 4, and each of the second main plate portions 51 is hidden by the sealing body 12 of the other power storage module 4. Accordingly, the pressure loss of the cooling fluid F caused by the first main plate portion 51 and the second main plate portion 52 can be prevented. In addition, a portion of the second sealing portion 22 located outside the current collector 20A in the Z direction functions as a positioning portion for the conductive plate 5A including the plate member 50A. In the present embodiment, a gap GP2 corresponding to a dimensional tolerance is provided between the plate member 50A and the sealing body 12 in the Y direction. The gap GP2 is not necessarily provided.

Returning to FIG. 5A, the plate member 50A includes a protrusion 61 provided on the end surface 50d and a depression 62 provided on the end surface 50c. The protrusion 61 and the depression 62 are formed in shapes that fit each other. The protrusion 61 extends from one end to the other end of the end surface 50d of the plate member 50A in the Y direction, and has the same XZ cross-sectional shape from one end to the other end of the end surface 50d in the Y direction. That is, the XZ cross-sectional shape of the protrusion 61 is uniform in the Y direction. The protrusion 61 linearly protrudes along the X direction, the protrusion 61 protruding from the central portion in the end surface 50d of the plate member 50A in the Z direction.

The depression 62 extends from one end to the other end of the end surface 50c in the Y direction, and has the same XZ cross-sectional shape from one end to the other end of the end surface 50c in the Y direction. That is, the XZ cross-sectional shape of the depression 62 is uniform in the Y direction. The bottom of the depression 62 in the X direction is constituted by the end surface 50c (second end surface). The depression 62 includes a pair of wall portions 62a linearly protruding along the X direction from both end portions of the end surface 50c in the Z direction. The distal end of each wall portion 62a has a chamfered shape (an R shape or a rounded shape).

The couple of plate members 50A adjacent to each other in the X direction are coupled to each other (not shown) by the protrusion 61 of one plate member 50A and the depression 62 of the other plate member 50A being fitted to each other to form the connecting portion 60. In the present embodiment, the connecting portion 60 includes the protrusion 61 protruding from the one plate member 50A side toward the other plate member 50A side in the X direction, and the depression 62 depressed toward the other plate member 50A side in the X direction and accommodating the protrusion 61. That is, in the present embodiment, the connecting portion 60 is configured by a part of one plate member 50A and a part of the other plate member 50A. The couple of plate members 50A adjacent to each other in the X direction are rotatably coupled to each other via a connecting portion 60 having a protrusion 61 and a depression 62. The protrusion 61 and the depression 62 may be in contact with each other or may not be in contact with each other in the Z direction.

Figure 5B:
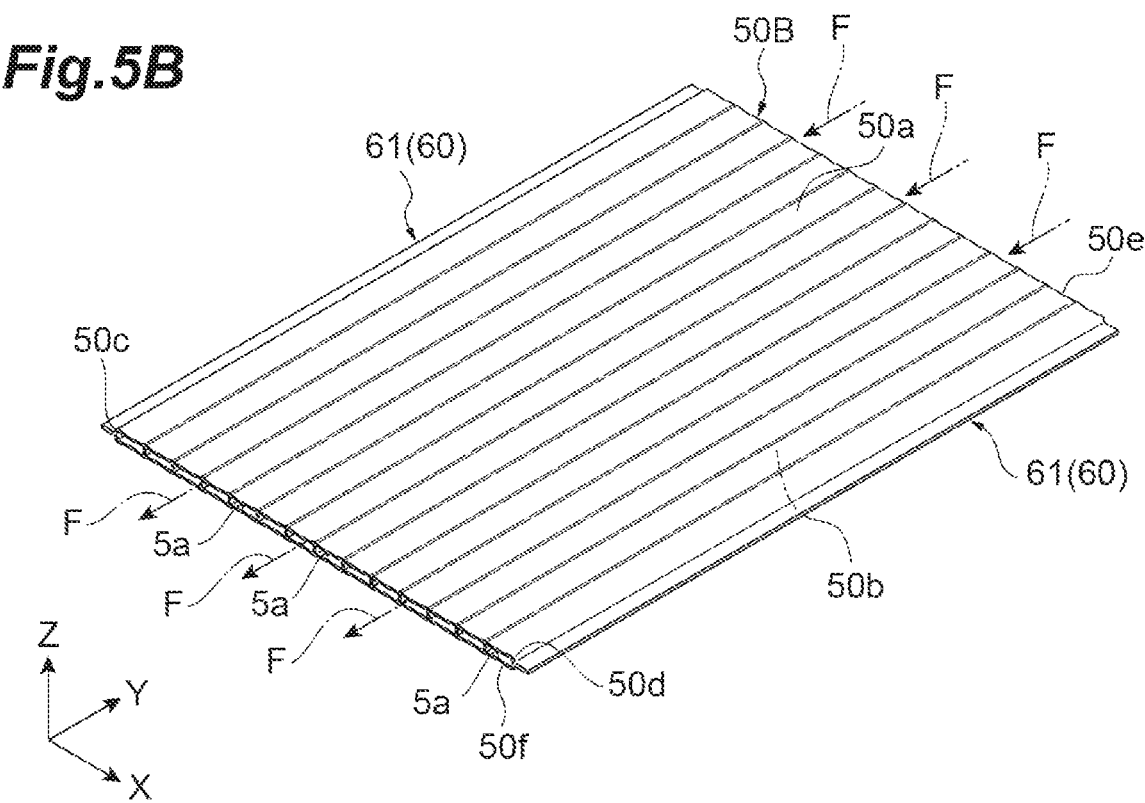

As shown in FIG. 5B, the plate member 50B is different from the plate member 50A (see FIG. 5A) in that the plate member 50B has a protrusion 61 instead of the depression 62 (see FIG. 5A) on the end surface 50c, and is the same as the plate member 50A in other respects. The plate member 50A and the plate member 50B adjacent to each other in the X direction are coupled to each other by the depression 62 of the plate member 50A and the protrusion 61 of the plate member 50B being fitted to each other to form the connecting portion 60. Similarly to the depressions 54,55 (see FIG. 6) of the plate member 50A, a depression (not shown) is formed in a portion of the plate member 50B that overlaps the through hole 5a in the Z direction. When the plate member 50B is positioned between the couple of power storage modules 4 in the Z direction, the through hole 5a of the plate member 50B is exposed from the gap between the couple of power storage modules 4.

The coupling of the plate members 50A and 50B forms a plurality of (three in the present embodiment) gaps G on each of the first surface 5f and the second surface 5g of the conductive plate 5A. The gap G is formed by the couple of plate members 50A adjacent to each other and by the couple of the plate members 50A and 50B adjacent to each other. The gap G extends in the Y direction along the end surface 50d. In the present embodiment, the couple of plate members 50A adjacent to each other are formed by the end surface 50d of one plate member 50A and the depression 62 of the other plate member 50A. The couple of plate members 50A and 50B adjacent to each other are formed by the end surface 50d of the plate member 50B and the depression 62 of the plate member 50A.

Although not shown, the conductive plate 5B is formed of a single plate member. The conductive plate 5B has, for example, a rectangular shape having the same area as the planar shape of the connected body in which the conductive plate 5A and the pair of detection elements 70 are connected to each other when viewed from the Z direction, and is disposed within the frame of the second sealing portion 22.

Next, the sealing member 80 will be described with reference to FIG. 8. The sealing member 80 is made of resin, for example. The sealing member 80 is made of, for example, a material not containing low-molecular siloxane. In this case, the contact failure of the relay is suppressed. The sealing member 80 is made of, for example, a material that is not easily hydrolyzed. In this case, a decrease in adhesive strength due to moisture is suppressed. The sealing member 80 is made of, for example, denatured silicon. The sealing member 80 is, for example, a liquid gasket. In the present embodiment, the sealing member 80 is an insulating resin, but may be a conductive resin. The sealing member 80 is provided between the conductive plate 5 and the power storage module 4. The modified silicon does not adhere to a polyolefin-based plastic material such as polypropylene (PP) having a low surface free energy (polarity). That is, the sealing member 80 made of modified silicon is not bonded to the detection element 70 made of such a resin material. Therefore, the adhesion of the sealing member 80 to the detection element 70 is realized by an anchor effect caused by the sealing member 80 biting into the unevenness of the surface and a physical interaction (intermolecular force).

The sealing member 80 is provided between the conductive plate 5 and the current collectors 20A and 20B at the stacked end of the power storage module 4, and joins (adheres) these to each other. The sealing member 80 is provided between the conductive plate 5 and the power storage module 4 in a liquid state before curing when the conductive plate 5 and the power storage module 4 are stacked. As a result, the sealing member 80 can follow the waviness or unevenness of the surface. The sealing member 80 includes, on the exposed surface 20d of the first surface 20a of the current collector 20A, a first sealing part 80a annularly provided along the inner edge 21c of the first sealing portion 21 so as to be in contact with the first sealing portion 21 provided on the edge portion 20c of the current collector 20A, and a plurality of second sealing parts 80b (three in the present embodiment) provided along the connecting portion 60 formed between the adjacent plate members 50. The sealing member 80 is applied by, for example, a dispenser.

The module stack 2 shown in FIG. 1 is formed, for example, by stacking the conductive plate 5 and the power storage module 4 in order from the bottom. Specifically, first, the sealing member 80 is provided at a predetermined position on the conductive plate 5B disposed at a stacked position, then, the power storage module 4 is stacked on the conductive plate 5B, and the conductive plate 5B and the power storage module 4 are joined with the sealing member 80. Subsequently, the sealing member 80 is provided at a predetermined position on the power storage module 4, then, the conductive plate 5A is stacked on the power storage module 4, and the power storage module 4 and the conductive plate 5A are joined with the sealing member 80. Similarly, a treatment of sequentially stacking the power storage module 4 and the conductive plate 5A is repeated while providing the sealing member 80 at a predetermined position. Finally, the sealing member 80 is provided at a predetermined position on the uppermost power storage module 4, then, the conductive plate 5B is stacked on the power storage module 4, and the power storage module 4 and the conductive plate 5B are joined with the sealing member 80. After all of the conductive plates 5 and the power storage modules 4 are stacked, the sealing members 80 are cured to form the module stack 2. While the conductive plates 5 and the power storage modules 4 are stacked, the sealing members 80 remains as liquid, and thus a surface pressure is unlikely to be applied to the conductive plates 5 and the power storage modules 4. Therefore, as the sealing member 80, selected is a liquid-form seal that has a long curing time and does not cure during the stacking step.

Figure 9:
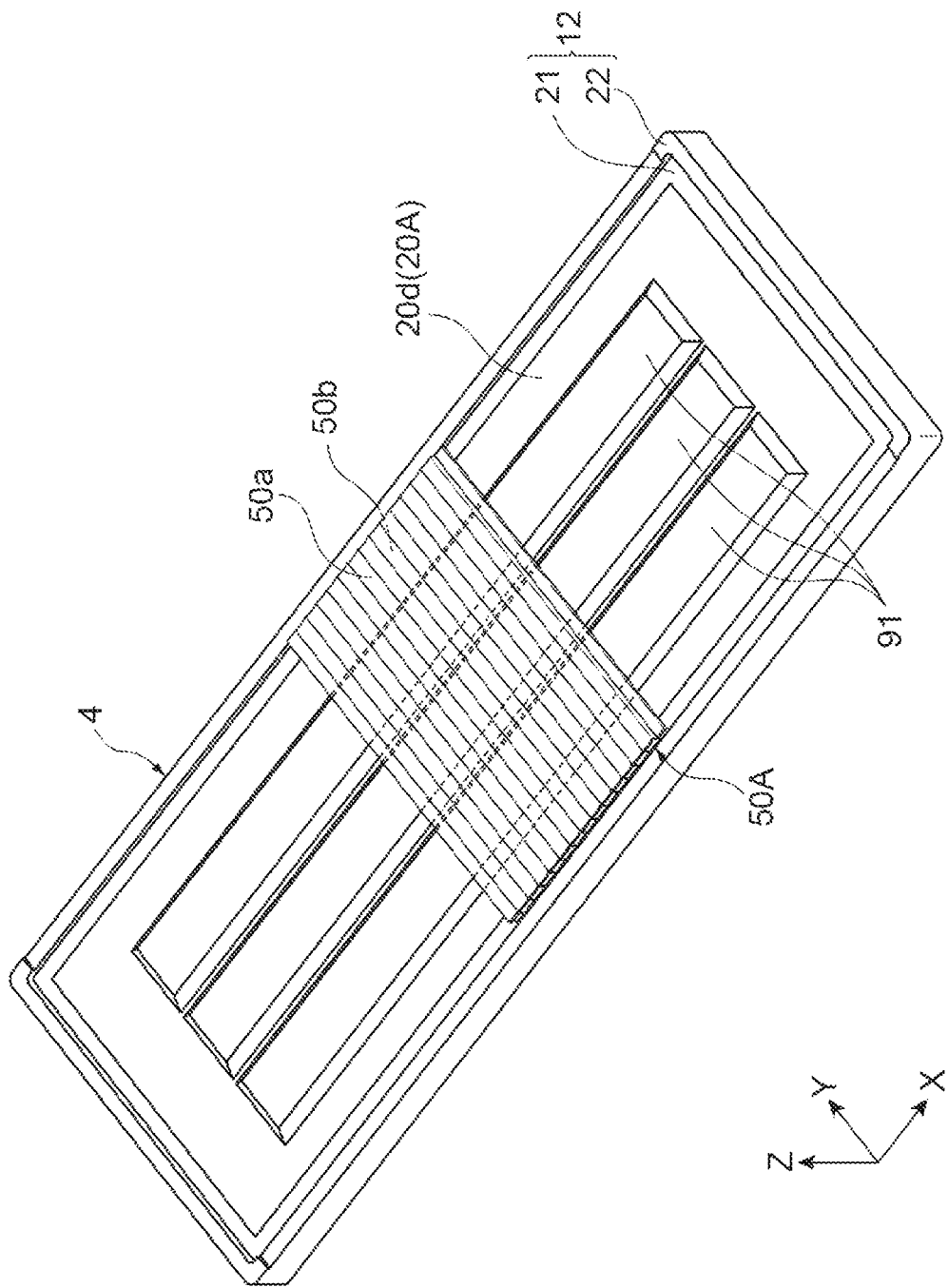
FIG. 9 is a schematic perspective view showing a part of the power storage module and a part of the conductive plate.

Hereinafter, the effects of the power storage device 1 according to the present embodiment will be described with reference to FIG. 9. FIG. 9 is a schematic perspective view showing a part of the power storage module and a part of the conductive plate. In FIG. 9, a part of the power storage modules 4 and a plate member 50A which is a part of the conductive plates 5A are shown. As shown in FIG. 9, the exposed surface 20d of the current collector 20A has a plurality of protrusions 91 extending along the X direction. On the other hand, each of the first surface 50a and the second surface 50b of the plate member 50A has a plurality of depressions 54,55 (see FIG. 6) extending along the Y direction. Therefore, the plurality of protrusions 91 and the plurality of depressions 55 in contact with the protrusions 91 intersect or are orthogonal to each other when viewed from the Z direction. Accordingly, for example, when the power storage device 1 to which a restraint load along the Z direction is applied vibrates, the plurality of depressions 55 and the plurality of protrusions 91 collide with each other to generate a favorable frictional force. Thus, even when an external impact is applied to the power storage device 1, the conductive plate 5A is less likely to slip with respect to the power storage module 4 at least in both the X direction and the Y direction. Therefore, according to the present embodiment, it is possible to provide the power storage device 1 capable of suppressing the deterioration of the cell characteristics due to the misalignment between the power storage module 4 and the conductive plate 5A.

In the present embodiment, the conductive plate 5A is an extrusion molded body of a conductive material, and the depressions 54,55 may be provided in at least one of the first surface 5f and the second surface 5g, and may include a recess extending along the extrusion direction of the conductive material. In this case, since the roughness of the first surface 5f and the second surface 5g is increased, the frictional force between the first surface 5f and the second surface 5g and the exposed surface 20d is increased. In addition, the surface of the plate member 50A constituting the through hole 5a may have a recess extending in the Y direction. In this case, dust or the like is less likely to accumulate in the through hole 5a, and the area of the surface constituting the through hole 5a increases. Therefore, the cooling performance of the conductive plate 5A can be improved. At least a part of the recess may be provided on the surface of the flexure. In this case, the frictional force between the exposed surface 20d and the first surface 5f and the second surface 5g can be further increased.

In the present embodiment, the conductive plate 5A may include a first main plate portion 51 having a first surface 51a, a first main plate portion 52 overlapping the second main plate portion 51 in the Z direction, and a plurality of partition portions 53 extending from one end to the other end of the first surface 50a in the Y direction (I.e., from the long side 5b to the long side 5c), the plurality of partition portions 53 being arranged in the Z direction to connect the first main plate portion 51 and the second main plate portion 52. The through holes 5a may be formed by the first main plate portion 51, the second main plate portion 52, and the plurality of partition portions 53. Each of the depressions 54 may include a flexure located between a couple of partition portions 53 included in the plurality of partition portions. The flexure may be performed toward the second main plate portion 52 in the Z direction. In this case, each flexure is provided so as to overlap the corresponding through hole 5a. Therefore, when viewed from the Z direction, the conductive plate 5A includes the plurality of through holes 5a overlapping the plurality of depressions 54 and extending from one end to the other end (that is, from the long side 5b to the long side 5c) of the first surface 50a in the Y direction. For example, in a case where each of the through holes 5a is used as a flow path through which the cooling fluid F flows, variation in the area of each of the flow paths in contact with the protrusion 91 is reduced compared to a case where the direction in which the plurality of protrusions 91 extend and the direction in which the plurality of depressions 54 extend are aligned. Therefore, variations in the cooling performance of the through holes 5a can be reduced. As a specific example, when both the protrusion 91 and the depressions 54,55 extend along the same direction when viewed from the Z direction, the depressions 54,55 may be provided between the adjacent protrusions 91. The cooling fluid F flowing through the through-hole 5a overlapping the depressions 54,55 is less likely to exchange heat with the power storage module 4. On the other hand, the cooling fluid F flowing through the through hole 5a overlapping with the protrusion 91 in the Z direction is favorably heat-exchanged with the power storage module 4. In this case, the temperature distribution tends to vary in at least one of the first surface 5f and the second surface 5g of the conductive plate 5A. That is, in-plane variation may occur in the cooling performance of the conductive plate 5A. In contrast, according to the present embodiment, each depression 55 overlaps the through hole 5a in the Z direction and is in contact with the plurality of protrusions 91. Thus, even when the cooling fluid F flows through each of the through holes 5a, the cooling fluid F is favorably heat-exchanged with the power storage module 4. Therefore, in the present embodiment, in-plane variations in the cooling performance of the conductive plate 5A are less likely to occur.

In the present embodiment, power storage device 1 may include another power storage module 4 located on the opposite side of power storage module 5 in the Z direction with conductive plate 5A interposed therebetween and in contact with second main plate portion 52, and when viewed from the Y direction, through holes 5a are exposed from a gap GP1 between the sealing body 12 of power storage module 4 and another sealing body 12 included in the another power storage module 4, and diameter H from one end to the other end of through hole 5a in the Z direction is equal to or larger than dimension D of the gap GP1 between the sealing body 12 and the another sealing body 12. Thus, for example, when the cooling fluid F flows through the through hole 5a via the gap GP1 between the sealing body 12 and the another sealing body 12, the pressure loss of the cooling fluid F between the gap GP1 and the through hole 5a can be reduced.

In the present embodiment, the exposed surface 20d may be a roughened surface. In this case, since the roughness of the exposed surface 20d increases, the frictional force between the exposed surface 20d and the first surface 5f or the second surface 5g increases. Moreover, in a case where the depressions 54,55 includes a recess provided on at least one of the first surface 50a and the second surface 50b, an anchor effect can be exhibited by the plurality of protruding plating structures provided on the roughened surface biting into the depression.

In the present embodiment, the exposed surface 20d may be provided with first unevenness including a plurality of protrusions 91, and at least one of the first surface 5f and the second surface 5g may be provided with second unevenness including the depressions 54 and/or the depressions 55. In this case, for example, when the power storage device 1 vibrates, the first unevenness and the second unevenness collide with each other, thereby generating more favorable friction force.

The embodiments described above describe one aspect of the present invention. Therefore, the present invention is not limited to the above-described embodiment, and can be modified. For example, in the above embodiment, the processing mark formed on the plate member extends in the Y direction, but the present invention is not limited thereto. For example, recesses (second recesses) extending in a direction intersecting the Y direction as viewed from the Z direction may be provided on the surfaces of the plate members. In this case, both a recess extending in the Y direction and a recess extending in a direction intersecting the Y direction may be provided on the surface of the plate member.

In the above embodiment, the groove of the positive electrode extends in the X direction, but the present invention is not limited thereto. Each of the plurality of grooves may extend in the Y direction or may extend in a direction intersecting the X direction and the Y direction. Also in this case, the depression included in the outer surface of the conductive plate extends in a direction orthogonal to or intersecting with the protrusion not overlapping with the groove. Therefore, the depression may extend in the X direction or may extend in a direction intersecting the X direction and the Y direction.

In the above embodiment, a plurality of grooves are formed in both the bipolar electrode and the positive electrode termination electrode, but the present invention is not limited thereto. For example, a plurality of grooves may be formed only in the bipolar electrode. In this case, a positive electrode which is a single positive electrode active material layer may be formed in the positive electrode terminal electrode. Alternatively, a plurality of grooves may be formed only in the positive terminal electrode.

In the above embodiment, the plurality of grooves are formed only in the positive electrode, but the present invention is not limited thereto. For example, at least one of the negative electrode included in the bipolar electrode and the negative electrode of the negative electrode termination electrode may include a plurality of grooves. When both the positive electrode and the negative electrode include a plurality of grooves, the grooves included in the negative electrode may completely overlap the grooves of the positive electrode in the Z direction.

In the above embodiment, in the Z direction, the center line of the gap along the Y direction between the sealing body of one power storage module and the sealing body of the other power storage module, and the center line of the through hole along the Y direction overlap each other, but the present invention is not limited thereto.

In the above-described embodiment, the depression of the first main plate portion in the conductive plate includes the recess provided on the first surface of the first main plate portion and the flexure positioned between a couple of partition portions adjacent to each other in the first main plate portion, but is not limited thereto. For example, the depression extending in the X direction may include only the flexure. In this case, at least a part of the depression on the first surface may extend in a direction intersecting the X direction when viewed from the Z direction. In other words, at least a portion of the depression may intersect the flexure. Similarly, the depression of the second main plate portion in the conductive plate may be located between a couple of partition portions adjacent to each other in the second main plate portion, and may include only flexure toward the first main plate portion. In this case, the recess in the second surface may extend in a direction intersecting the X direction when viewed from the Z direction.

In the above-described embodiment, the current collector constituting one end portion of the plurality of current collectors included in the electrode laminate (that is, the current collector disposed at the stacked end of the electrode laminate) may be the current collector included in the positive terminal electrode or the current collector included in the negative terminal electrode. Alternatively, the current collector may be a member different from the plurality of current collectors included in the electrode laminate.

What is claimed is:

1. A power storage device comprising:
   a power storage module; and
   a conductive plate stacked on the power storage module in a first direction,
   wherein the power storage module and the conductive plate are configured to receive a restraint load along the first direction,
   wherein the power storage module comprises:
      an electrode laminate including current collectors laminated in the first direction; and
      a sealing body provided to surround a side surface of the electrode laminate,
   wherein the current collectors include:
      a first current collector included in a negative terminal electrode;
      a second current collector included in a positive terminal electrode; and
      a third current collector included in a bipolar electrode provided between the negative terminal electrode and the positive terminal electrode,
   wherein at least one of the positive terminal electrode, the negative terminal electrode, and the bipolar electrode includes an active material layer having grooves arranged in a second direction orthogonal to the first direction,
   wherein each of grooves extends in a third direction intersecting the second direction when viewed from the first direction,
   wherein the conductive plate includes an outer surface including depressions, the depressions being depressed in the first direction and extending in the second direction,
   wherein a current collector disposed at a stacked end of the electrode laminate includes an exposed surface, the exposed surface being exposed from the sealing body and in contact with the outer surface of the conductive plate,
   wherein the exposed surface includes protrusions overlapping the active material layer in the first direction, and
   wherein the protrusions protrude in the first direction and extend in the third direction.

2. The power storage device according to claim 1,
   wherein the conductive plate is an extrusion molded body of a conductive material, and
   wherein the depressions include a recess provided in the outer surface and extending along an extrusion direction of the conductive material.

3. The power storage device according to claim 1,
   wherein the conductive plate includes:
      a first main plate portion including the outer surface;
      a second main plate portion overlapping the first main plate portion in the first direction; and
      partition portions extending from one end of the outer surface to the other end of the outer surface in the second direction, arranged in the third direction, and connecting the first main plate portion and the second main plate portion,
   wherein through holes are provided by the first main plate portion, the second main plate portion, and the partition portions,
   wherein each of the depressions:
      do not overlap the partition portions in the first direction; and
      include a flexure in the first main plate portion, the flexure being located between a couple of the partition portions adjacent to each other, and
   wherein the flexure is bended toward the second main plate portion in the first direction.

4. The power storage device according to claim 1,
   wherein the outer surface further includes a second recess provided on the outer surface, the second recess intersecting at least a part of the depressions,
   wherein the conductive plate includes:
      a first main plate portion including the outer surface;
      a second main plate portion overlapping the first main plate portion in the first direction; and
      partition portions extending from one end of the outer surface to the other end of the outer surface in the second direction, arranged in the third direction, and connecting the first main plate portion and the second main plate portion,
   wherein through holes are provided by the first main plate portion, the second main plate portion, and the plurality of partition portions,
   wherein each of the depressions:
      do not overlap the partition portions in the first direction, and
      include a flexure in the first main plate portion, the flexure being located between a couple of the partition portions adjacent to each other, and
   wherein the flexure is bended toward the second main plate portion in the first direction.

5. The power storage device according to claim 3, further comprising a second power storage module located on an opposite side of the power storage module with the conductive plate interposed therebetween in the first direction, the second power storage module being in contact with the second main plate portion, wherein the through holes are exposed from a gap formed between the sealing body of the power storage module and a second sealing body included in the second power storage module in a second direction, and wherein a diameter from one end of the through hole to the other end thereof in the first direction is equal to or larger than an interval of the gap in the first direction.

6. The power storage device according to claim 4, further comprising a second power storage module located on an opposite side of the power storage module with the conductive plate interposed therebetween in the first direction, the second power storage module being in contact with the second main plate portion, wherein the through holes are exposed from a gap formed between the sealing body of the power storage module and a second sealing body included in the second power storage module in a second direction, and wherein a diameter from one end of the through hole to the other end thereof in the first direction is equal to or larger than an interval of the gap in the first direction.

7. The power storage device according to claim 1, wherein the exposed surface is a roughened surface.

8. The power storage device according to claim 1, wherein the current collector including the exposed surface is the first current collector or the second current collector.

9. A power storage device comprising:
a power storage module; and
a conductive plate stacked on the power storage module in a first direction,
wherein the power storage module comprises an electrode laminate including a negative terminal electrode, a bipolar electrode, a positive terminal electrode and a current collector laminated in order in the first direction,
wherein at least one of the positive terminal electrode, the negative terminal electrode, and the bipolar electrode includes an active material layer having grooves arranged in a second direction orthogonal to the first direction,
wherein each of grooves extends in a third direction intersecting the second direction when viewed from the first direction,
wherein the conductive plate includes an outer surface including depressions, the depressions being depressed in the first direction and extending in the second direction,
wherein the current collector includes an exposed surface in contact with the outer surface of the conductive plate,
wherein the exposed surface includes protrusions overlapping the active material layer in the first direction, and
wherein the protrusions protrude in the first direction and extend in the third direction.

10. The power storage device according to claim 9,
wherein the conductive plate is an extrusion molded body of a conductive material, and
wherein the depressions include a recess provided in the outer surface and extending along an extrusion direction of the conductive material.

11. The power storage device according to claim 9,
wherein the conductive plate includes:
a first main plate portion including the outer surface;
a second main plate portion overlapping the first main plate portion in the first direction; and
partition portions extending from one end of the outer surface to the other end of the outer surface in the second direction, arranged in the third direction, and connecting the first main plate portion and the second main plate portion,
wherein through holes are provided by the first main plate portion, the second main plate portion, and the partition portions,
wherein each of the depressions:
do not overlap the partition portions in the first direction; and
include a flexure in the first main plate portion, the flexure being located between a couple of the partition portions adjacent to each other, and
wherein the flexure is bended toward the second main plate portion in the first direction.

12. The power storage device according to claim 9,
wherein the outer surface further includes a second recess provided on the outer surface, the second recess intersecting at least a part of the depressions,
wherein the conductive plate includes:
a first main plate portion including the outer surface;
a second main plate portion overlapping the first main plate portion in the first direction; and
partition portions extending from one end of the outer surface to the other end of the outer surface in the second direction, arranged in the third direction, and connecting the first main plate portion and the second main plate portion,
wherein through holes are provided by the first main plate portion, the second main plate portion, and the plurality of partition portions,
wherein each of the depressions:
do not overlap the partition portions in the first direction, and
include a flexure in the first main plate portion, the flexure being located between a couple of the partition portions adjacent to each other, and
wherein the flexure is bended toward the second main plate portion in the first direction.

13. The power storage device according to claim 11, further comprising a second power storage module located on an opposite side of the power storage module with the conductive plate interposed therebetween in the first direction, the second power storage module being in contact with the second main plate portion, wherein the through holes are exposed from a gap formed between a first sealing body of the power storage module and a second sealing body included in the second power storage module in a second direction, and wherein a diameter from one end of the through hole to the other end thereof in the first direction is equal to or larger than an interval of the gap in the first direction.

14. The power storage device according to claim 12, further comprising a second power storage module located on an opposite side of the power storage module with the conductive plate interposed therebetween in the first direction, the second power storage module being in contact with the second main plate portion, wherein the through holes are exposed from a gap formed between a first sealing body of the power storage module and a second sealing body included in the second power storage module in a second direction, and wherein a diameter from one end of the through hole to the other end thereof in the first direction is equal to or larger than an interval of the gap in the first direction.

15. A power storage device comprising:
a power storage module; and
a conductive plate stacked on the power storage module in a first direction,
wherein the power storage module comprises an electrode laminate including a positive terminal electrode, a bipolar electrode, a negative terminal electrode and a current collector laminated in order in the first direction,
wherein at least one of the positive terminal electrode, the negative terminal electrode, and the bipolar electrode includes an active material layer having grooves arranged in a second direction orthogonal to the first direction,
wherein each of grooves extends in a third direction intersecting the second direction when viewed from the first direction,
wherein the conductive plate includes an outer surface including depressions, the depressions being depressed in the first direction and extending in the second direction,
wherein the current collector includes an exposed surface in contact with the outer surface of the conductive plate,
wherein the exposed surface includes protrusions overlapping the active material layer in the first direction, and
wherein the protrusions protrude in the first direction and extend in the third direction.

16. The power storage device according to claim 15,
wherein the conductive plate is an extrusion molded body of a conductive material, and
wherein the depressions include a recess provided in the outer surface and extending along an extrusion direction of the conductive material.

17. The power storage device according to claim 15,
wherein the conductive plate includes:
a first main plate portion including the outer surface;
a second main plate portion overlapping the first main plate portion in the first direction; and
partition portions extending from one end of the outer surface to the other end of the outer surface in the second direction, arranged in the third direction, and connecting the first main plate portion and the second main plate portion,
wherein through holes are provided by the first main plate portion, the second main plate portion, and the partition portions,
wherein each of the depressions:
do not overlap the partition portions in the first direction; and
include a flexure in the first main plate portion, the flexure being located between a couple of the partition portions adjacent to each other, and
wherein the flexure is bended toward the second main plate portion in the first direction.

18. The power storage device according to claim 15,
wherein the outer surface further includes a second recess provided on the outer surface, the second recess intersecting at least a part of the depressions,
wherein the conductive plate includes:
a first main plate portion including the outer surface;
a second main plate portion overlapping the first main plate portion in the first direction; and
partition portions extending from one end of the outer surface to the other end of the outer surface in the second direction, arranged in the third direction, and connecting the first main plate portion and the second main plate portion,
wherein through holes are provided by the first main plate portion, the second main plate portion, and the plurality of partition portions,
wherein each of the depressions:
do not overlap the partition portions in the first direction, and
include a flexure in the first main plate portion, the flexure being located between a couple of the partition portions adjacent to each other, and
wherein the flexure is bended toward the second main plate portion in the first direction.

19. The power storage device according to claim 17, further comprising a second power storage module located on an opposite side of the power storage module with the conductive plate interposed therebetween in the first direction, the second power storage module being in contact with the second main plate portion,
wherein the through holes are exposed from a gap formed between a first sealing body of the power storage module and a second sealing body included in the second power storage module in a second direction, and
wherein a diameter from one end of the through hole to the other end thereof in the first direction is equal to or larger than an interval of the gap in the first direction.

20. The power storage device according to claim 18, further comprising a second power storage module located on an opposite side of the power storage module with the conductive plate interposed therebetween in the first direction, the second power storage module being in contact with the second main plate portion,
wherein the through holes are exposed from a gap formed between a first sealing body of the power storage module and a second sealing body included in the second power storage module in a second direction, and
wherein a diameter from one end of the through hole to the other end thereof in the first direction is equal to or larger than an interval of the gap in the first direction.

* * * * *